United States Patent
Namba et al.

(10) Patent No.: US 7,094,813 B2
(45) Date of Patent: Aug. 22, 2006

(54) INK-JET RECORDING INK, INK-JET RECORDING INK SET, INK CARTRIDGE, INK-JET PRINTER, AND INK-JET PRINTING METHOD

(75) Inventors: Michihiko Namba, Kanagawa (JP); Toshiroh Tokuno, Kanagawa (JP); Akihiko Gotoh, Kanagawa (JP); Kiyofumi Nagai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/912,449

(22) Filed: Aug. 5, 2004

(65) Prior Publication Data

US 2005/0054751 A1    Mar. 10, 2005

Related U.S. Application Data

(63) Continuation of application No. PCT/JP03/01106, filed on Feb. 4, 2003.

(30) Foreign Application Priority Data

| Feb. 5, 2002 | (JP) | ............ 2002-028068 |
| May 21, 2002 | (JP) | ............ 2002-145855 |

(51) Int. Cl.
- *C09D 11/10* (2006.01)
- *C08F 2/22* (2006.01)
- *B41J 2/01* (2006.01)
- *B41J 2/015* (2006.01)

(52) U.S. Cl. .............. 523/160; 524/801; 347/100

(58) Field of Classification Search .......... 523/160, 523/161; 106/31.27, 31.57, 31.59, 31.6, 106/31.85, 31.89, 31.5, 31.8; 524/800, 801; 347/22, 54, 100
See application file for complete search history.

(56) References Cited

U.S. PATENT DOCUMENTS

| 5,623,296 | A * | 4/1997 | Fujino et al. ............ 347/103 |
| 5,746,818 | A | 5/1998 | Yatake |
| 5,750,592 | A | 5/1998 | Shinozuka et al. |
| 5,942,560 | A * | 8/1999 | Idogawa et al. ........... 523/161 |
| 5,943,080 | A * | 8/1999 | Kubota et al. ............ 347/100 |
| 6,004,389 | A | 12/1999 | Yatake |
| 6,087,416 | A * | 7/2000 | Pearlstine et al. ......... 523/160 |
| 6,232,370 | B1 * | 5/2001 | Kubota et al. ............ 523/161 |
| 6,251,987 | B1 * | 6/2001 | Sacripante et al. ........ 524/555 |
| 6,375,728 | B1 * | 4/2002 | Yamashita et al. ........ 106/31.6 |
| 6,379,443 | B1 * | 4/2002 | Komatsu et al. ......... 106/31.58 |
| 6,436,180 | B1 | 8/2002 | Ma et al. |
| 6,695,443 | B1 * | 2/2004 | Arita et al. ............. 347/100 |
| 2002/0083866 | A1 * | 7/2002 | Arita et al. ............ 106/31.27 |
| 2003/0019395 | A1 | 1/2003 | Ma et al. |
| 2003/0105187 | A1 | 6/2003 | Iijima |
| 2003/0236321 | A1 * | 12/2003 | Sano et al. ............. 523/160 |
| 2004/0020406 | A1 * | 2/2004 | Kato ................... 106/31.6 |
| 2004/0024085 | A1 * | 2/2004 | Ishizuka et al. .......... 523/160 |
| 2005/0165130 | A9 * | 7/2005 | Ikeda et al. ............. 523/160 |

FOREIGN PATENT DOCUMENTS

| EP | 0586101 | A1 | 3/1994 |
| EP | 1074589 | A1 | 2/2001 |
| EP | 1138729 | A1 * | 10/2001 |
| JP | 646074 | | 1/1989 |
| JP | 64 031881 | | 2/1989 |
| JP | 4-214781 | | 8/1992 |
| JP | 04 214781 | | 8/1992 |
| JP | 4-220473 | | 8/1992 |
| JP | 04 220473 | | 8/1992 |
| JP | 04 309573 | | 11/1992 |
| JP | 4-309573 | | 11/1992 |
| JP | 05 186704 | | 7/1993 |
| JP | 05 230409 | | 7/1993 |
| JP | 08 003498 | | 1/1996 |
| JP | WO 97 48769 | | 12/1997 |
| JP | 10 140064 | | 5/1998 |
| JP | 2000 017207 | | 1/2000 |
| JP | 2000 053897 | | 2/2000 |
| JP | 2000-53897 | | 2/2000 |
| JP | 2000 212486 | | 2/2000 |
| JP | 2000 239590 | | 5/2000 |
| JP | 2000 191972 | | 7/2000 |

(Continued)

OTHER PUBLICATIONS

May 4, 2005 Communication and Supplementary European Search Report in connection with European Application No. EP 03 73 7483 which corresponds to the above-identified application.

*Primary Examiner*—Callie Shosho
(74) *Attorney, Agent, or Firm*—Cooper & Dunham LLP

(57) ABSTRACT

An ink and ink set characterized in that both a combination of a specific wetting agent, penetrating agent, and water-soluble organic solvent and use of surfactant, particularly fluorine surfactant are enabled by using water dispersion in which polymer fine particles contain coloring material. Even when plain paper is printed at high speed by ink-jet recording by using this ink and ink set, the ink and ink set can realize a pigment ink for ink-jet recording, an ink set, an ink-jet recording method, ink cartridge, and recorder which have an excellent ejection stability and excellent preservability, and provide (1) good color tone, (2) high image density, (3) recorded image free of unsharpness near character or image and feathering and high in sharpness, (4) less boundary color bleedings between different colors, (5) image adaptable to both-side printing and causing less strike-throughs, and (6) image fastness such as water resistance and light resistance.

51 Claims, 2 Drawing Sheets

FOREIGN PATENT DOCUMENTS

| | | |
|---|---|---|
| JP | 2000 265096 | 9/2000 |
| JP | 2000-265096 | 9/2000 |
| JP | 2001 139849 | 5/2001 |
| JP | 2001-139849 | 5/2001 |
| JP | 2003 096345 | 4/2003 |
| JP | 2003-96345 | 4/2003 |

* cited by examiner

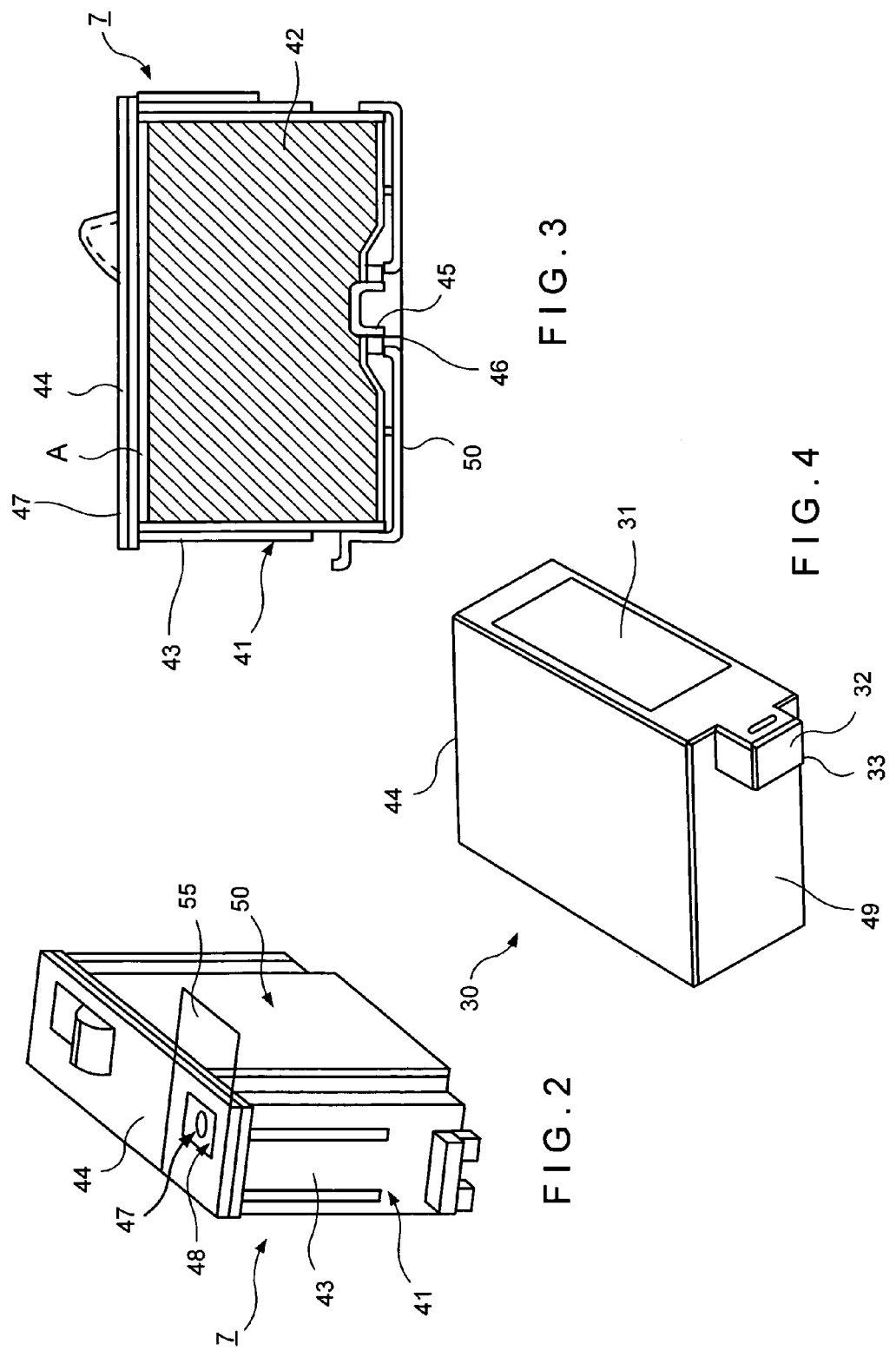

INK-JET RECORDING INK, INK-JET RECORDING INK SET, INK CARTRIDGE, INK-JET PRINTER, AND INK-JET PRINTING METHOD

CROSS-REFERENCE TO RELATED APPLICATIONS

This is a continuation of Application PCT/JP03/01106, filed on Feb. 4, 2003.

BACKGROUND OF THE INVENTION

1. Field of the Invention

The present invention relates to an ink-jet recording ink, an ink-jet recording ink set, an ink cartridge, an ink-jet printer, and an ink-jet printing method which use a pigment as a coloring material. Especially, the present invention relates to an ink-jet recording pigment ink and an ink-jet recording pigment ink set which can print on plain paper at high speed a high quality image with good color tone and good chroma, yield a high quality image with good color tone with a minute amount of character feathering and color bleeding, obtain an image excellent in rigidity such as waterproof and light resistance, be excellent in preservability, and excellent in ejection stability without causing head clogging in the printing.

2. Description of the Related Art

From its advantages such as low noise, low running cost and the like, an ink-jet printer is remarkably pervaded, and a color printer capable of printing color image on plain paper is more and more placed on the market. It is, however, very difficult to meet all required properties including color reproducibility of an image, durability, light resistance, image dryness, character feathering, color boundary bleeding (for short, color bleeding), both-side printing property, ejection stability, and the like. With this, the ink used is selected based on a preferential property for a specific application. Especially, meeting the above required properties are difficult for the printer for high-speed plain paper printing.

Generally, with its principle component of water, the ink for the ink-jet printing contains a coloring agent, and further contains a wetting agent such as glycerin and the like for clogging prevention. As the coloring agent, dye has been used in view of its excellent coloring property and stability. An image obtained by using a dye ink does not have good light resistance, waterproof, and the like. The waterproof is improved to a certain extent by improvement of ink-jet record paper having an ink absorbing layer, which improvement does not, however, apply sufficiently to the plain paper.

Recently, for solving the above problems, a pigment ink using as coloring agent an organic pigment, carbon black and the like in place of the dye is taken into account. The pigment is insoluble in water. Thereby, the pigment can be used as an aqueous ink in which the pigment is mixed and dispersed with a dispersing agent for stable dispersion in water. Use of the pigment can bring about waterproof and light resistance, but cannot meet other properties at the same time. Especially, the high-speed printing of the plain paper cannot obtain high image density and high coloring property, failing to sufficiently meet the character feathering, the color bleeding, the both-side printing property and the like.

The pigment ink has, compared with the dye ink, more problems in terms of the coloring property and stability. Especially, with improvement in high-image technology of OA (office automation) printers, the pigment ink is required to have printing quality, hue, chroma, gloss, preservability which are equivalent to those of the dye ink. However, a conventional pigment ink does not necessarily meet the above required properties. For example, it is generally known that especially a magenta ink and a cyan ink used for the pigment ink have respectively C. I. pigment red 122 and C. I. pigment blue 15:3. Compared with the dye ink, the pigment ink has a different color reproduction range. Moreover, the pigment ink carries out color toning for reducing hue error, in this case, however, the chroma is forced to be decreased, thus deteriorating the printing quality.

On the contrary, the pigment itself is more and more improved for changing the hue not by the color toning. Japanese Patent Application Laid-Open (JP-A) No. 2000-17207 discloses a phthalocyanine pigment having a specific crystalline structure in which a cyan pigment is proposed which has a hue in the same color range as that of the cyan dye. The above proposal does not meet all the required properties in terms of cost and the like.

JP-A No. 2000-239590 discloses an ink set using a pigment for coloring material of black ink and using a dye for coloring materials of yellow ink, magenta ink, and cyan ink. Although the above proposal is made in so many other disclosures, they are not sufficient for plain paper printing.

In the ink-jet printing, a stable ejection of an ink droplet from a thin nozzle of an ink-jet recording head is needed. For meeting the above, it is necessary that dryness of an orifice of the ink-jet recording head does not cause solidification and the like of the ink. Use of a dispersing agent-contained ink for the ink-jet printing may sometimes cause clogging or ink's ejection failure which may be attributable to a resin and the like (of the dispersing agent) that is not dissolved again after adhering to the orifice and the like. Especially, a long-time stoppage of the printing is likely to cause the clogging of the nozzle and the like, moreover, the long-time stoppage may cause ink's accumulation (the ink with increased viscosity) in a nozzle cap or in a maintenance mechanism such as intake-tube and the like, thus losing function of the maintenance mechanism. A temporary stoppage of printing, or a temporary stoppage of using a nozzle that corresponds to a blanked document or a blanked image may cause a printing failure and the like which may be attributable to disoriented direction of injection of ink droplet (intermittent ejection failure). The above problems occurred so often. An aqueous pigment ink containing the dispersing agent is viscous and causes a resistance in a path to a nozzle's head end in the long-time continuous ejection and a high-speed printing, thus making the ejection unstable and making it difficult to achieve a smooth printing.

JP-A No. 64-6074 and JP-A No. 01-31881 disclose a specific surfactant for the purpose of reducing surface tension of an ink using a pigment as a coloring agent. Each of JP-A No. 64-6074 and JP-A No. 01-31881 disclosing the specific surfactant, however, deteriorates printing quality due to character feathering, the color bleeding and the like, thus making it impossible to obtain ejection stability compatible with printing quality. JP-A No. 05-230409 and the like disclose a technology using a fluorine compound, in which the examples of using the pigment for the coloring agent are rare, failing to obtain a good property.

For solving the above problems, JP-A No. 2000-212486 discloses an ink having specific agents and property such as pigment, pigment density, water-soluble dispersing agent, and penetrating agent; an ink containing polyhydric alcohol alkylether derivatives; and an ink set thereof. The ink disclosed in JP-A No. 2000-212486 has a super permeability, and thereby has a sufficient dryness even at a high-sped printing and has a secured ejection stability. The ink disclosed in JP-A No. 2000-212486 is, however, inferior to a dye ink in terms of image density, color reproducibility and the like when the plain paper is used. Although more improved in character feathering, color bleeding and both-side printing property than a conventional ink-jet print image, a print image disclosed in JP-A No. 2000-212486 is inferior to a print image of an electrophotographic method and the like used for plain paper printing on the market, thereby is in need of more improvement.

For improving durability of the image, an ink is disclosed which contains a coloring agent-encapsulated resin dispersion which encapsulates a coloring agent in an insoluble-and-dispersing resin. However, the above ink does not obtain a sufficient image density when a carbon black is used as the coloring agent. A color organic pigment used as the coloring agent for a conventional ink is inferior to a dye ink in terms of image density, color reproducibility and the like on the plain paper. An ink set of the above coloring agent-encapsulated resin dispersion which set combines a black ink with a color ink cannot bring about a sufficient color boundary bleeding between black and yellow.

Other dispersing methods include a self-dispersion type pigment ink which is capable of making a stable dispersion without a dispersing agent. In terms of a black pigment ink, JP-A No.05-186704 and JP-A No.08-3498 disclose so-called a self-dispersion type carbon black which is capable of making a stable dispersion without a dispersing agent by introducing a hydrophilic group to a surface of carbon. Moreover, in terms of a color pigment ink, JP-A No. 2000-513396 discloses a color pigment which is capable of making a stable dispersion without a dispersing agent.

Combining the above self-dispersion type pigment inks is low in terms of chroma of a color image on plain paper, and deteriorated in terms of friction resistance on special gloss paper. Adding a resin emulsion for improving the friction resistance may decrease dispersion stability of the ink, thus losing ejection stability.

Alternatively, JP-A No. 10-140064 discloses an ink set comprising a black ink and a color ink in which a black ink having a self-dispersion type carbon black and a color ink containing a coloring material whose polarity is opposite to that of a coloring material of the black ink. Furthermore, JP-A No. 2000-191972 discloses an ink set having coloring agent-encapsulated resin dispersion inks having different ionicities. A printed matter printed with the above ink sets are improved in terms of color bleeding, however, still failing to meet other properties of the plain paper.

SUMMARY OF THE INVENTION

It is an object of the present invention to provide, after solving the above conventional shortcomings, an ink and an ink set which use a pigment as a coloring material for an aqueous ink for ink-jet printing.

It is another object of the present invention to provide an ink-jet printing method using the ink, an ink cartridge receiving therein the ink, and a printer equipped with the ink cartridge.

Especially, the object of the present invention is to provide the ink-jet recording pigment ink, the ink set, the ink-jet printing method, the ink cartridge, and the printer which can give, in addition to excellent ejection stability and excellent preservability, the following properties even for high-speed printing on plain paper using the ink-jet printing method: (1) good color tone, (2) high image density, (3) high print image having high sharpness without feathering around character and image (hereinafter referred to as "feathering" as the case may be), (4) color bleeding between different colors, (5) image having a minute amount of strike-throughs for both-side printing, (6) image rigidity such as waterproof and light resistance.

According to a first aspect of the present invention, there is provided an ink-jet recording ink, comprising: a polymer emulsion which comprises a polymer fine particle containing a coloring material, the coloring material being insoluble in water or being unlikely to dissolve in the water; at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane; one of a polyol, as a second hydroxy compound, having 8 to 11 carbon atoms, and a glycol ether having 8 to 11 carbon atoms; a water-soluble organic solvent; water; at least one of an anionic surfactant, a nonionic surfactant, and an amphoteric surfactant; and at least one fluorine surfactant, wherein the ink-jet recording ink has a viscosity of 5 mPa.sec or more at 25° C.

According to a second aspect of the present invention, the viscosity of the ink-jet recording ink is 8 mPa.sec to 20 mPa.sec at 25° C.

According to a third aspect of the present invention, the ink-jet recording ink has a surface tension 40 dyne/cm or less.

According to a fourth aspect of the present invention, a content of the polymer emulsion comprising the coloring material is 8 weight % to 20 weight % as-solid content.

According to a fifth aspect of the present invention, a content of the wetting agent is 10 weight % to 50 weight %.

According to a sixth aspect of the present invention, a weight ratio of the wetting agent to the polymer emulsion as the solid content is 2 to 5.

According to a seventh aspect of the present invention, the ink-jet recording ink comprising the polymer emulsion comprising the coloring material has an average particle diameter 0.16 µm or less.

According to an eighth aspect of the present invention, a content of the fluorine surfactant is 0.05 weight % to 5 weight %.

According to a ninth aspect of the present invention, one of a vinyl polymer and a polyester polymer constitutes the polymer emulsion.

According to a tenth aspect of the present invention, one of the polyol, as the second hydroxy compound, having the 8 to 11 carbon atoms, and the glycol ether having the 8 to 11 carbon atoms comprises 2-ethyl-1,3-hexane diol.

According to an eleventh aspect of the present invention, one of the polyol, as the second hydroxy compound, having the 8 to 11 carbon atoms, and the glycol ether having the 8 to 11 carbon atoms comprises 2,2,4-trimethyl-1,3-pentane diol.

According to a twelfth aspect of the present invention, the fluorine surfactant is at least one selected from the group consisting of perfluoroalkyl sulfonate, perfluoroalkyl carboxylate, perfluoroalkyl phosphoric acid ester, perfluoroalkyl ethylene oxide adduct, perfluoroalkyl betaine, and perfluoroalkyl amineoxide compound.

According to a thirteenth aspect of the present invention, the fluorine surfactant in the ink-jet recording ink is the perfluoroalkyl sulfonate expressed by the following formula A, and uses a pigment as the coloring material:

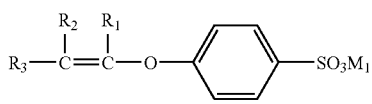
Formula A wherein $R_1$, $R_2$, and $R_3$ denote one of a perfluoro alkyl group and a fluorine atom, and M1 denotes any one of Li, Na, and K.

According to a fourteenth aspect of the present invention, at least one of the anionic surfactant, the nonionic surfactant, and the amphoteric surfactant is selected from the group consisting of surfactants expressed respectively by the following formulas (I), (II), (III), (IV), (V), (VI), (VII), (VIII), and (IX), and the at least one of the anionic surfactant, the nonionic surfactant, and the amphoteric surfactant comprises the at least one fluorine surfactant according to the twelfth aspect:

$$R_1\text{—O—}(CH_2CH_2O)mCH_2COOM \qquad (I)$$

wherein $R_1$ denotes a branchable alkyl group having 6 to 14 carbon atoms, m denotes an integer of 3 to 12, M denotes an alkali metal ion, a quaternary ammonium, a quaternary phosphonium, and an alkanolamine,

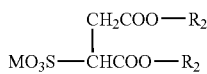
(II)

wherein $R_2$ denotes a branched alkyl group having 5 to 16 carbon atoms, M denotes an alkali metal ion, a quaternary ammonium, a quaternary phosphonium, and an alkanolamine,

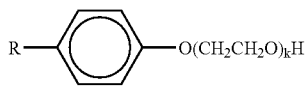
(III)

wherein R denotes a branchable carbon chain having 6 to 14 carbon atoms, and k denotes an integer of 5 to 20, $$R\text{—}(OCH_2CH_2)nOH \qquad (IV)$$

wherein R is a branchable carbon chain having 6 to 14 carbon atoms, and n denotes an integer of 5 to 20,

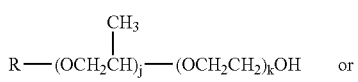

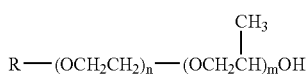
(V)

wherein R denotes a branchable carbon chain having 6 to 14 carbon atoms, j, k, m, and n denote integers of 1 to 20.

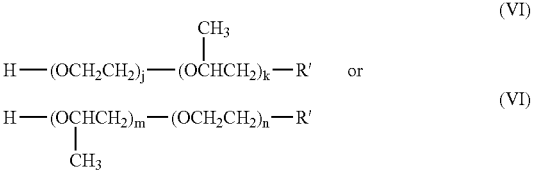
(VI)

(VI)

wherein R' denotes a carbon chain having 6 to 14 carbon atoms, j, k, m, and n denote integers of 1 to 20.

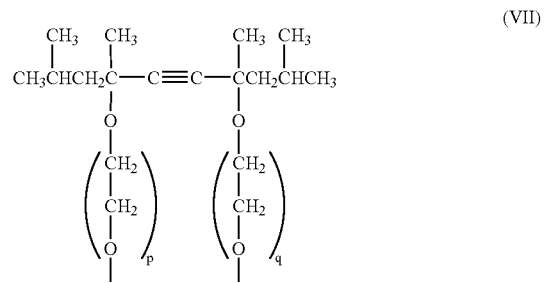
(VII)

wherein p and q are integers of 0 to 40,

(VIII)

wherein each of $R_1$ and $R_2$ denotes an alkyl group having 1 to 3 carbon atoms or a hydroxyalkyl group having 1 to 3 carbon atoms, $R_3$ denotes an alkyl group having 10 to 20 carbon atoms or an alkenyl group having 10 to 20 carbon atoms,

(IX)

wherein each of $R_1$ and $R_2$ denotes an alkyl group having 1 to 3 carbon atoms or a hydroxyalkyl group having 1 to 3 carbon atoms, $R_3$ denotes an alkyl group having 10 to 16 carbon atoms, wherein $R_3$ is allowed to contain an amide group, otherwise, $R_3$ is an alkyl group derived from a coconut oil.

According to a fifteenth aspect of the present invention, the ink-jet recording ink further comprises a compound expressed by the following formula:

$$HO\text{—}(CH_2)n\text{-}OH$$

wherein n denotes an integer of 5, 7 and 8.

According to a sixteenth aspect of the present invention, the ink-jet recording ink further comprises at least one of the following: a polyol as a third hydroxy compound other than the first hydroxy compounds and the second hydroxy compound, a lactam, a carbamide, an alkyl glycine, a betaine compound, and a saccharide.

According to a seventeenth aspect of the present invention, the third hydroxy compound comprises one selected from the group consisting of ethylene glycol, tetraethylene glycol, hexylene glycol, polyethylene glycol, tripropylene glycol, 2,3-butane diol, 1,3-propane diol, 1,4-butane diol, 2-methyl-2,4-pentane diol, 1,2,4-butane triol, 1,2,6-hexane triol, thiodiglycol, and pentaerythritol.

According to an eighteenth aspect of the present invention, the lactam comprises one selected from the group consisting of 2-pyrrolidone, N-methyl-2-pyrrolidone, N-hydroxyethyl-2-pyrrolidone, and ϵ-caprolactam.

According to a nineteenth aspect of the present invention, the carbamide comprises one selected from the group consisting of urea, thiocarbamide, ethylene carbamide, 1,3-dimethyl-2-imidazolidinone.

According to a twentieth aspect of the present invention, the saccharide comprises one selected from the group consisting of maltitol, sorbitol, gluconolactone, and maltose.

According to a twenty first aspect of the present invention, there is provided an ink-jet recording ink set, comprising: a black ink; and at least one color ink, wherein the black ink comprises; a self-dispersion type pigment, at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane, one of: a polyol, as a second hydroxy compound, having 8 to 11 carbon atoms, and a glycol ether having 8 to 11 carbon atoms, at least one of an anionic surfactant, a nonionic surfactant, and an amphoteric surfactant, a water-soluble organic solvent, and water, wherein the black ink has a viscosity of 5 mPa.sec or more at 25° C., wherein the color ink comprises; a water dispersion which is a polymer emulsion which comprises a polymer fine particle containing a coloring material, the coloring material being insoluble in water or being unlikely to dissolve in the water, at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane, one of a polyol, as a second hydroxy compound, having 8 to 11 carbon atoms, and a glycol ether having 8 to 11 carbon atoms, a water-soluble organic solvent, water, at least one of an anionic surfactant, a nonionic surfactant, and an amphoteric surfactant, and at least one fluorine surfactant, wherein the color ink has a viscosity of 5 mPa.sec or more at 25° C.

According to a twenty second aspect of the present invention, the viscosity of the ink is 8 mPa.sec to 20 mPa.sec at 25° C.

According to a twenty third aspect of the present invention, the ink-jet recording ink set has a surface tension 40 dyne/cm or less.

According to a twenty fourth aspect of the present invention, a content of at least one of the pigment and the polymer emulsion is 8 weight % to 20 weight % as solid content.

According to a twenty fifth aspect of the present invention, a content of the wetting agent is 10 weight % to 50 weight %.

According to a twenty sixth aspect of the present invention, an average particle diameter of a particle contained is 0.16 μm or less.

According to a twenty seventh aspect of the present invention, the self-dispersion type pigment comprises on a surface thereof at least one hydrophilic group selected from the group consisting of a carboxyl group, a sulfone group, a carbonyl group, and a hydroxyl group.

According to a twenty eighth aspect of the present invention, the self-dispersion type pigment comprises on a surface thereof, via at least another atomic group, at least one hydrophilic group selected from the group consisting of a carboxyl group, a sulfone group, a carbonyl group, and a hydroxyl group.

According to a twenty ninth aspect of the present invention, one of the polyol, as the second hydroxy compound, having the 8 to 11 carbon atoms, and the glycol ether having the 8 to 11 carbon atoms comprises 2-ethyl-1,3-hexane diol.

According to a thirtieth aspect of the present invention, one of the polyol, as the second hydroxy compound, having the 8 to 11 carbon atoms, and the glycol ether having the 8 to 11 carbon atoms comprises 2,2,4-trimethyl-1,3-pentane diol.

According to a thirty first aspect of the present invention, the fluorine surfactant is at least one selected from the group consisting of perfluoroalkyl sulfonate, perfluoroalkyl carboxylate, perfluoroalkyl phosphoric acid ester, perfluoroalkyl ethylene oxide adduct, perfluoroalkyl betaine, and perfluoroalkyl amineoxide compound, and a content of the fluorine surfactant is 0.05 weight % to 5 weight %.

According to a thirty second aspect of the present invention, the fluorine surfactant in the ink is the perfluoroalkyl sulfonate expressed by the following formula B, and uses a pigment as the coloring material:

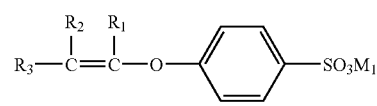

Formula B wherein $R_1$, $R_2$, and $R_3$ denote one of a perfluoro alkyl group and a fluorine atom, and M1 denotes any one of Li, Na, and K.

According to a thirty third aspect of the present invention, at least one of the anionic surfactant, the nonionic surfactant, and the amphoteric surfactant is selected from the group consisting of surfactants expressed respectively by the following formulas (I), (II), (III), (IV), (V), (VI), (VII), (VIII), and (IX), and the at least one of the anionic surfactant, the nonionic surfactant, and the amphoteric surfactant comprises the at least one fluorine surfactant according to the thirty first aspect:

$$R_1-O-(CH_2CH_2O)mCH_2COOM \qquad (I)$$

wherein $R_1$ denotes a branchable alkyl group having 6 to 14 carbon atoms, m denotes an integer of 3 to 12, M denotes an alkali metal ion, a quaternary ammonium, a quaternary phosphonium, and an alkanolamine, $$\begin{array}{c} CH_2COO-R_2 \\ | \\ MO_3S-CHCOO-R_2 \end{array} \qquad (II)$$

wherein $R_2$ denotes a branched alkyl group having 5 to 16 carbon atoms, M denotes an alkali metal ion, a quaternary ammonium, a quaternary phosphonium, and an alkanolamine,

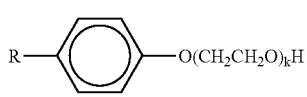
(III)

wherein R denotes a branchable carbon chain having 6 to 14 carbon atoms, and k denotes an integer of 5 to 20,

 (IV)

wherein R is a branchable carbon chain having 6 to 14 carbon atoms, and n denotes an integer of 5 to 20,

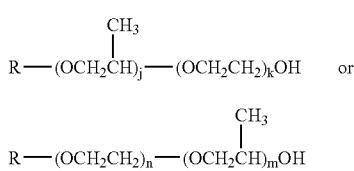
(V)

(V)

wherein R denotes a branchable carbon chain having 6 to 14 carbon atoms, j, k, m, and n denote integer of 1 to 20.

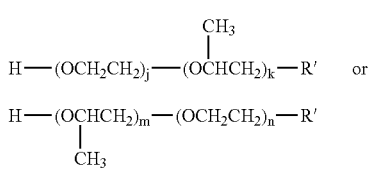
(VI)

(VI)

wherein R' denotes a carbon chain having 6 to 14 carbon atoms, j, k, m, and n denote integer of 1 to 20,

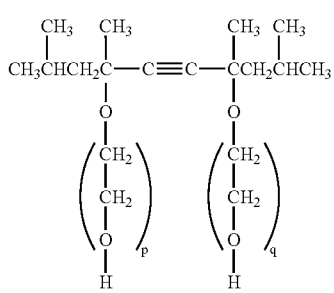
(VII)

wherein p and q are integers of 0 to 40,

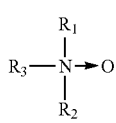
(VIII)

wherein each of $R_1$ and $R_2$ denotes an alkyl group having 1 to 3 carbon atoms or a hydroxyalkyl group having 1 to 3 carbon atoms, $R_3$ denotes an alkyl group having 10 to 20 carbon atoms or an alkenyl group having 10 to 20 carbon atoms,

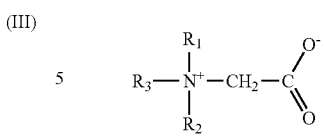
(IX)

wherein each of $R_1$ and $R_2$ denotes an alkyl group having 1 to 3 carbon atoms or a hydroxyalkyl group having 1 to 3 carbon atoms, $R_3$ denotes an alkyl group having 10 to 16 carbon atoms, wherein $R_3$ is allowed to contain an amide group, otherwise, $R_3$ is an alkyl group derived from a coconut oil.

According to a thirty fourth aspect of the present invention, the ink-jet recording set further comprises a compound expressed by the following formula:

wherein n denotes an integer of 5, 7 and 8.

According to a thirty fifth aspect of the present invention, the ink-jet recording ink set further comprises at least one of the following: a polyol as a third hydroxy compound other than the first hydroxy compounds and the second hydroxy compound, a lactam, a carbamide, an alkyl glycine, a betaine compound, and a saccharide.

According to a thirty sixth aspect of the present invention, there is provided an ink-jet printing method for ejecting an ink by applying an energy to an ink-jet recording ink. The ink jet recording ink comprises: a polymer emulsion which comprises a polymer fine particle containing a coloring material, the coloring material being insoluble in water or being unlikely to dissolve in the water; at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane; one of: a polyol, as a second hydroxy compound, having 8 to 11 carbon atoms, and a glycol ether having 8 to 11 carbon atoms; a water-soluble organic solvent; water; at least one of an anionic surfactant, a nonionic surfactant, and an amphoteric surfactant; and at least one fluorine surfactant, wherein the ink-jet recording ink has a viscosity of 5 mPa.sec or more at 25° C.

According to a thirty seventh aspect of the present invention, the ink is ejected by applying thereto a heat energy.

According to a thirty eighth aspect of the present invention, the ink is ejected by applying thereto a dynamic energy.

According to a thirty ninth aspect of the present invention, the ink-jet recording ink according to the first aspect is used under the following conditions: an Mj of 5 pl to 35 pl, a Vj of 6 m to 20 m, a frequency of 1 kHz or more, a resolution of 300 dpi or more, and one pass printing. Hereinabove, the Mj denotes a size of a droplet of the ink ejected from the nozzle, and the Vj denotes a velocity of the droplet of the ink ejected from the nozzle.

According to a fortieth aspect of the present invention, there is provided an ink-jet printing method for ejecting an ink by applying an energy to an ink-jet recording ink set. The ink-jet recording ink set comprises: a black ink; and at least one color ink, wherein the black ink comprises; a self-dispersion type pigment, at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane, one of a polyol, as a second hydroxy compound, having 8 to 11 carbon atoms, and a glycol ether having 8 to 11 carbon atoms, at least one of an anionic surfactant, a nonionic surfactant, and an amphoteric surfactant, a water-soluble organic solvent, and water, wherein the black ink has a viscosity of 5 mPa.sec or more at 25° C., wherein the color ink comprises; a water dispersion which is a polymer emulsion which comprises a polymer fine particle containing a coloring material, the coloring material being insoluble in water or being unlikely to dissolve in the water, at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane, one of a polyol, as a second hydroxy compound, having 8 to 11 carbon atoms, and a glycol ether having 8 to 11 carbon atoms, a water-soluble organic solvent, water, at least one of an anionic surfactant, a nonionic surfactant, and an amphoteric surfactant, and at least one fluorine surfactant, wherein the color ink has a viscosity of 5 mPa.sec or more at 25° C.

According to a forty first aspect of the present invention, the ink is ejected by applying thereto a heat energy.

According to a forty second aspect of the present invention, the ink is ejected by applying thereto a dynamic energy.

According to a forty third aspect of the present invention, the ink-jet recording ink set according to the twenty first aspect is used under the following conditions: an Mj of 5 pl to 35 pl, a Vj of 6 m to 20 m, a frequency of 1 kHz or more, a resolution of 300 dpi or more, and one pass printing.

Hereinabove, the Mj denotes a size of a droplet of the ink ejected from a nozzle, and the Vj denotes a velocity of the droplet of the ink ejected from the nozzle.

According to a forty fourth aspect of the present invention, there is provided an ink cartridge, comprising an ink receiver receiving therein an ink-jet recording ink. The ink-set recording ink comprises: a polymer emulsion which comprises a polymer fine particle containing a coloring material, the coloring material being insoluble in water or being unlikely to dissolve in the water; at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane; one of: a polyol, as a second hydroxy compound, having 8 to 11 carbon atoms, and a glycol ether having 8 to 11 carbon atoms; a water-soluble organic solvent; water; at least one of an anionic surfactant, a nonionic surfactant, and an amphoteric surfactant; and at least one fluorine surfactant, wherein the ink-jet recording ink has a viscosity of 5 mPa.sec or more at 25° C.

According to a forty fifth aspect of the present invention, there is provided an ink cartridge, comprising an ink receiver receiving therein an ink-jet recording ink set. The ink-jet recording ink set comprises: a black ink; and at least one color ink, wherein the black ink comprises; a self-dispersion type pigment, at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane, one of a polyol, as a second hydroxy compound, having 8 to 11 carbon atoms, and a glycol ether having 8 to 11 carbon atoms, at least one of an anionic surfactant, a nonionic surfactant, and an amphoteric surfactant, a water-soluble organic solvent, and water, wherein the black ink has a viscosity of 5 mPa.sec or more at 25° C., wherein the color ink comprises; a water dispersion which is a polymer emulsion which comprises a polymer fine particle containing a coloring material, the coloring material being insoluble in water or being unlikely to dissolve in the water; at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane, one of: a polyol, as a second hydroxy compound, having 8 to 11 carbon atoms, and a glycol ether having 8 to 11 carbon atoms, a water-soluble organic solvent, water, at least one of an anionic surfactant, a nonionic surfactant, and an amphoteric surfactant, and at least one fluorine surfactant, wherein the color ink has a viscosity of 5 mPa.sec or more at 25° C.

According to a forty sixth aspect of the present invention, there is provided an ink-jet printer, comprising: one of an ink receiver and an ink cartridge receiving therein: an ink-jet recording ink; and one of an ink-jet recording head and a record unit which drops and ejects the ink by an action of an energy. The ink-jet recording ink comprises: a polymer emulsion which comprises a polymer fine particle containing a coloring material, the coloring material being insoluble in water or being unlikely to dissolve in the water; at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane; one of a polyol, as a second hydroxy compound, having 8 to 11 carbon atoms, and a glycol ether having 8 to 11 carbon atoms; a water-soluble organic solvent; water; at least one of an anionic surfactant, a nonionic surfactant, and an amphoteric surfactant; and at least one fluorine surfactant, wherein the ink-jet recording ink has a viscosity of 5 mPa.sec or more at 25° C.

According to a forty seventh aspect of the present invention, the ink-jet recording head has a nozzle plate which has a surface formed with an ink-repellent coating layer subjected to a eutectic plating.

According to a forty eighth aspect of the present invention, the ink-jet recording head has a nozzle diameter of 30 µm or less.

According to a forty ninth aspect of the present invention, there is provided an ink jet printer, comprising: one of an ink receiver and an ink cartridge receiving therein: an ink-jet recording ink set; and one of an ink-jet recording head and a record unit which drops and ejects the ink by an action of an energy. The ink-jet recording ink set comprises: a black ink; and at least one color ink, wherein the black ink comprises; a self-dispersion type pigment, at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane, one of: a polyol, as a second hydroxy compound, having 8 to 11 carbon atoms, and a glycol ether having 8 to 11 carbon atoms, at least one of an anionic surfactant, a nonionic surfactant, and an amphoteric surfactant, a water-soluble organic solvent, and water; wherein the black ink has a viscosity of 5 mPa.sec or more at 25° C., wherein the color ink comprises; a water dispersion which is a polymer emulsion which comprises a polymer fine particle containing a coloring material, the coloring material being insoluble in water or being unlikely to dissolve in the water, at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane, one of: a polyol, as a second hydroxy compound, having 8 to 11 carbon atoms, and a glycol ether having 8 to 11 carbon atoms, a water-soluble organic solvent, water, at least one of an anionic surfactant, a nonionic surfactant, and an amphoteric surfactant, and at least one fluorine surfactant, wherein the color ink has a viscosity of 5 mPa.sec or more at 25° C.

According to a fiftieth aspect of the present invention, the ink-jet recording head has a nozzle plate which has a surface formed with an ink-repellent coating layer subjected to a eutectic plating.

According to a fifty first aspect of the present invention, the ink-jet recording head has a nozzle diameter of 30 μm or less.

According to a fifty second aspect of the present invention, there is provided a recorded article on which a recording is carried out by a printing method for ejecting an ink by applying an energy to an ink-jet recording ink.

The ink-jet recording ink comprises: a polymer emulsion which comprises a polymer fine particle containing a coloring material, the coloring material being insoluble in water or being unlikely to dissolve in the water; at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane; one of a polyol, as a second hydroxy compound, having 8 to 11 carbon atoms, and a glycol ether having 8 to 11 carbon atoms; a water-soluble organic solvent; water; at least one of an anionic surfactant, a nonionic surfactant, and an amphoteric surfactant; and at least one fluorine surfactant, wherein the ink-jet recording ink has a viscosity of 5 mPa.sec or more at 25° C.

According to a fifty third aspect of the present invention, there is provided a recorded article on which a recording is carried out by a printing method for ejecting an ink by applying an energy to an ink-jet recording ink set. The ink-jet recording ink set comprises: a black ink; and at least one color ink, wherein the black ink comprises; a self-dispersion type pigment, at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane, one of: a polyol, as a second hydroxy compound, having 8 to 11 carbon atoms, and a glycol ether having 8 to 11 carbon atoms, at least one of an anionic surfactant, a nonionic surfactant, and an amphoteric surfactant, a water-soluble organic solvent, and water, wherein the black ink has a viscosity of 5 mPa.sec or more at 25° C., wherein the color ink comprises; a water dispersion which is a polymer emulsion which comprises a polymer fine particle containing a coloring material, the coloring material being insoluble in water or being unlikely to dissolve in the water; at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane, one of a polyol, as a second hydroxy compound, having 8 to 11 carbon atoms, and a glycol ether having 8 to 11 carbon atoms, a water-soluble organic solvent, water, at least one of an anionic surfactant, a nonionic surfactant, and an amphoteric surfactant, and at least one fluorine surfactant, wherein the color ink has a viscosity of 5 mPa.sec or more at 25° C.

BRIEF DESCRIPTION OF THE DRAWINGS

FIG. 2 is an external perspective view of the ink cartridge before being incorporated into a printer under the present invention.

FIG. 3 is a cross section of the ink cartridge under the present invention.

FIG. 4 is an external perspective view of a record unit which is integrated with a recording head under the present invention.

DESCRIPTION OF THE PREFERRED EMBODIMENTS

Figure 1:
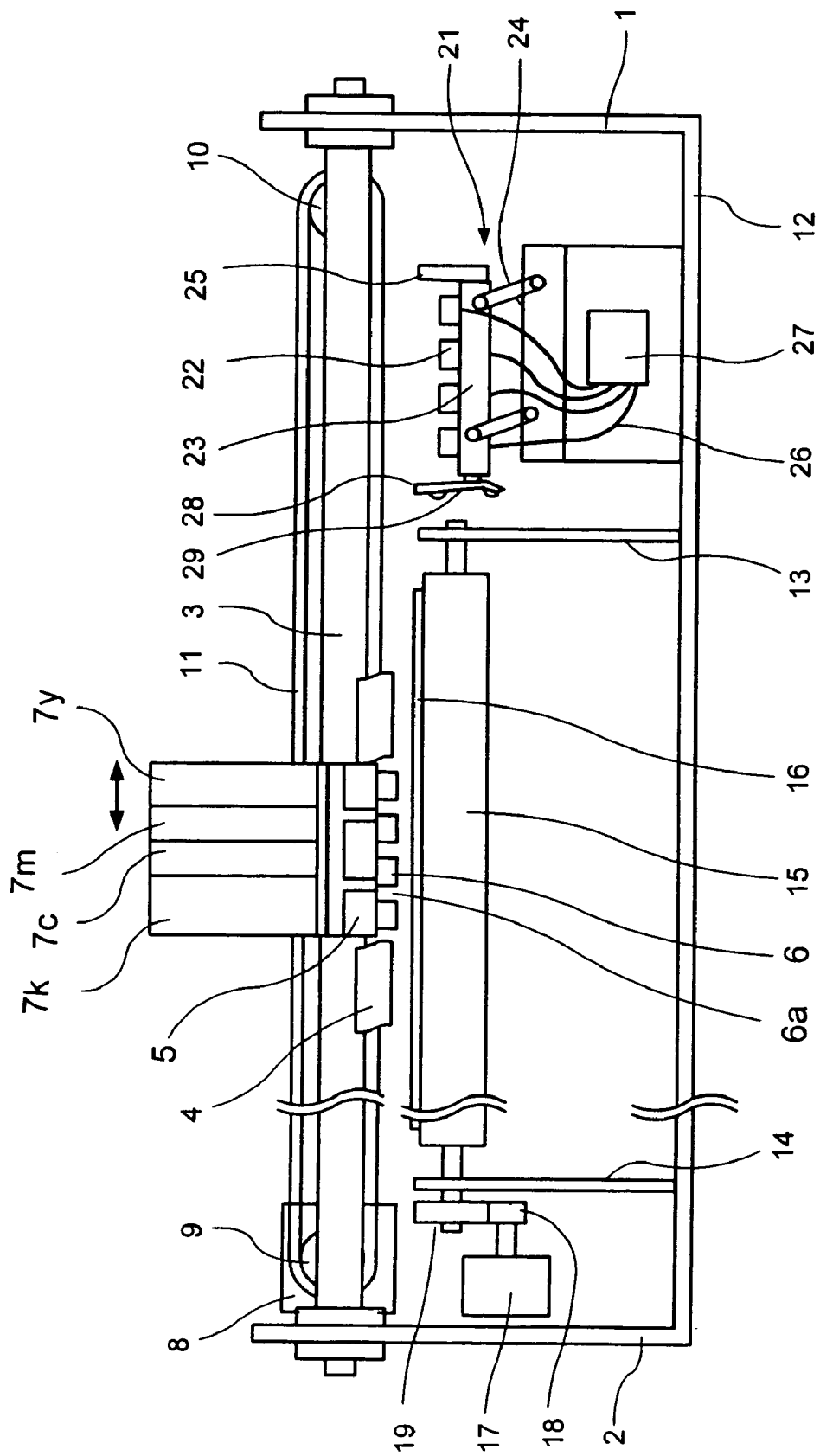
FIG. 1 is a schematic front view of a mechanism part of a serial ink-jet printer which incorporates therein an ink cartridge equipped with a recording liquid receiver receiving therein a recording liquid, under the present invention.

After studying hard on the above problems, the present inventors have found the following: With a water dispersion (hereinafter referred to as "emulsion" as the case may be) containing a coloring material in a polymer fine particle, an ink which meets a common use of a combination of specific agents (such as wetting agent, penetrating agent and water-soluble organic solvent) with a surfactant (especially, fluorine surfactant) is low in surface tension even when the above ink has higher viscosity than a conventional ink. In addition to the properties of a conventional high-penetration ink such as high-speed penetration of vehicle and likelihood of coloring material composition remaining on the surface (which properties may be observed at high-speed printing on plain paper), the above ink especially having the common use of the fluorine surfactant can easily leave the coloring material composition on the paper surface, eliminate concentration of coloring materials to thereby achieve uniform distribution thereof on the paper surface, remarkably improve a uniform dying property on the paper, resulting in an image with high chroma, high coloring density, and a minute amount of strike-throughs.

Moreover, the present inventors have found the following. In an ink set comprising a black ink and a color ink, combining the color ink (which contains a colored polymer fine particle and has the above structure) with the black ink (which uses a self-dispersion type carbon black as a coloring material, and has high viscosity and low surface tension like the color pigment ink) can bring about the following effects at high-speed plain paper printing: increase image density of black, extremely reduce color bleedings between black and color, be excellent in coloring property, obtain a print image excellent in both-side printing property with a minute amount of strike-throughs. Furthermore, the present inventors have found out the following. Using in combination a specific hydroxy compound having a specific structure can obtain a print image that is excellent in ejection reliability, has proper penetration, is especially excellent in dryness, and excellent in character feathering and color bleeding, and a print image that is capable of making a more remarkable chroma improvement when the fluorine surfactant is combined with the remaining specific-structure surfactant (especially, the fluorine surfactant having a specific structure can make a further more remarkable chroma improvement), is excellent in coloring property, and is excellent in both-side printing property with a minute amount of strike-throughs.

A first feature of the recording ink under the present invention is use of an aqueous ink and an aqueous ink set which ink has a low surface tension of 40 dyne/cm or less (namely, 40 mN/m or less) at 25° C., and more preferably 35 dyne/cm or less. After studying hard on various measures for improving dryness of the print image, the present inventors have found that adjusting the surface tension of the ink to 40 dyne/cm or less can bring about a speedy penetration-drying to substantially all recording materials. The surface tension of the ink of 40 dyne/cm or less can better wetting state of the ink to a head member, thereby even a high-viscosity ink of 8 cps or more (25° C.) can improve frequency response and remarkably improve ejection stability. The ink having the above low surface tension can be obtained by combining, in terms of ink composition, a polyol or a glycol ether with a fluorine surfactant.

A second feature of the present invention is a remarkable improvement in printing quality by using a high-viscosity ink of 5 cps or more (25° C.), and more preferably 8 cps or more (25° C.). A low-viscosity ink of about 3 cps (25° C.) used for a conventional ink-jet printer has its water content of about 70%, while the ink having high viscosity of 8 cps or more (25° C.) can render its water content of about 50% or less, increasing moisture-evaporation rate (caused when an ink droplet reaches a paper face) 2.0 times to 3.0 times. With this, a high-density pigment can increase its cohesion rate on the paper face, thus substantially eliminating the feathering.

A third feature of the present invention is that a polymer emulsion containing a coloring material in the ink has a density of 8 weight % or more (solid content), and more preferably 10 weight % or more (solid content). Constituting an ink set by using a self-dispersion type carbon black as the coloring material is expected to allow a black ink to have pigment density of 6 weight % or more, and more preferably 8 weight % or more. Increasing polymer emulsion density or pigment density can increase ink's viscosity, thereby easing cohesion of the pigment on the paper face and improving coloring density and color tone, in addition, substantially eliminating the feathering.

A fourth feature of the present invention is that a high-viscosity wetting agent is used which is a mixture of glycerin with at least one high-viscosity wetting agent selected from the group consisting of glycerin, 3-butanediol, triethylene glycol, 1,6-hexanediol, propylene glycol, 1,5-pentanediol, diethylene glycol, dipropylene glycol, trimethylol propane, and trimethylol ethane, instead of a low-viscosity wetting agent which is a mixture of a conventional ethylene glycol (diethylene glycol) with a glycerin. Using the high-viscosity wetting agent can, in addition to a high pigment density, bring about a high-viscosity ink.

The ink composition under the present invention is a recording ink having its ink viscosity of 5 cps or more, more preferably 8 cps or more (25° C.), showing below a constitution of the recording ink. With a coloring material for printing and a water for dispersing the coloring material as necessary compositions, the ink under the present invention contains agents added upon necessity such as a wetting agent, a water-soluble organic solvent, a surfactant, an emulsion, a preservative, a pH regulator, and the like. Mixing a wetting agent 1-i with a wetting agent 1-ii is for activating features of each of the wetting agents and for adjusting viscosity, but the above mixture of the wetting agent 1-i and the wetting agent 1-ii is not always the case.

(1) Coloring agent
(2) Wetting agent 1-i (glycerin)
(3) Wetting agent 1-ii (at least one type selected from the group consisting of 1,3-butanediol, triethylene glycol, 1,6-hexanediol, propylene glycol, 1,5-pentanediol, diethylene glycol, dipropylene glycol, trimethylol propane, and trimethylol ethane; first hydroxy compound)
(4) Water-soluble organic solvent
(5) Surfactant
(6) Polyol (a second hydroxy compound) having 8 to 11 carbon atoms or glycol ether having 8 to 11 carbon atoms
(7) Preservative
(8) pH regulator
(9) Pure water Described below is about constitutional element of each ink.

A coloring material is made of a polymer emulsion comprising a polymer fine particle containing the coloring material insoluble in water or unlikely to dissolve in water. In this specification, the term, "fine particle containing coloring material" means at least one of a first state of sealing the coloring material in the polymer fine particle and a second state of adhering the coloring material to a surface of the polymer fine article. In this case, all the coloring materials blended with the ink under the present invention are not necessarily be sealed or absorbed to the polymer fine particle. Instead, within a scope that the effect of the present invention is not lost, the coloring material can be dispersed in the emulsion. As long as being insoluble in water or unlikely to dissolve in water, and having the property to be adhered to the polymer, the above coloring material is not specifically limited. In this specification, the term "insoluble in water" or the term "unlikely to dissolve in water" means that the coloring material is not dissolved by 10 weight part or more relative to a water 100 weight part at 20° C. The above "dissolve" means that a visual inspection cannot find any separation or deposition of the coloring material on soluble water's surface layer or lower layer. The examples of the above coloring material include dye (which is oil-soluble, dispersible, and the like), pigment, and the like. From the view point of good absorption and sealability, the oil-soluble dye or the dispersible dye is preferable, while in view of light resistance of the obtained image, the pigment is preferable.

From the view point of efficient impregnation in the polymer fine particle, each of the dyes under the present invention is preferably dissolved by 2 g/liter or more in an organic solvent such as ketone solvent, and more preferably 20 g/liter to 600 g/liter.

Under the present invention, the example of a black pigment includes a carbon black. The examples of the color pigment include anthraquinone, phthalocyanine blue, phthalocyanine green, diazo, monoazo, pyranthrone, perylene, heterocyclic ring yellow, quinacridone, and (thio)indigoid. Typical examples of the phthalocyanine blue includes copper phthalocyanine blue and derivatives thereof (pigment blue 15). Typical examples of the quinacridone include pigment orange 48, pigment orange 49, pigment red 122, pigment red 192, pigment red 202, pigment red 206, pigment red 207, pigment red 209, pigment violet 19, and pigment violet 42. Typical examples of the anthraquinone include pigment red 43, pigment red 194 (perinone red), pigment red 216 (pyranthrone bromide), and pigment red 226 (pyranthrone red). Typical examples of the perylene include pigment red 123 (Vermillion), pigment red 149 (scarlet), pigment red 179 (maroon), pigment red 190 (red), pigment violet, pigment red 189 (yellow shade read), and pigment red 224. Typical examples of the thioindigoid include pigment red 86, pigment red 87, pigment red 88, pigment red 181, pigment red 198, pigment violet 36, and pigment violet 38. Typical examples of the heterocyclic ring yellow include pigment red yellow 117 and pigment yellow 138. The examples of other proper pigments for coloring are described in "The Colour Index Version 3 (The Society of Dyers and Colourists, 1982)." For the pigment used as coloring agent, the above dyes can be used in combination for assisting and toning the color.

Blending of the above coloring material is about 10 weight % to 200 weight % relative to the polymer, and preferably about 25 weight % to 150 weight %.

The polymer constituting the polymer emulsion can use, for example, vinyl polymer, polyester polymer, polyurethane polymer, and the like. Especially preferred is the vinyl polymer and the polyester polymer, which are those disclosed in JP-A No. 2000-53897 and JP-A No. 2001-139849.

According to a preferred aspect of the present invention, an average diameter of the polymer fine particles containing the above coloring materials is most preferably 0.16 µm or less in the ink.

Content of the polymer fine particle in the ink is preferably 8 weight % to 20 weight % in solid content, and more preferably 8 weight % to 12 weight %.

Other wetting agents preferably contain saccharide. The examples of the saccharide include monosaccharide, disaccharide, oligosaccharide (including trisaccharide and tetrasaccharide) and other polysaccharide. The examples of the preferable saccharide include glucose, mannose, fructose, ribose, xylose, arabinose, galactose, maltose, cellobiose, lactose, sucrose, trehalose, maltotriose, and the like. Herein, the term polysaccharide means the saccharide in a broad sense, including substances present extensively in nature such as α-cyclodextrin, cellulose, and the like.

Derivatives of the above saccharides include reducing sugar of the above (for example, sugar alcohol (formula $HOCH_2(CHOH)nCH_2OH$ (where n=2 to 5)), oxidized sugar (for example, aldonic acid, uronic acid, and the like), amino acid, thioic acid, and the like. Especially preferable is the sugar alcohol, the examples thereof including maltitol, sorbitol, and the like. Additionally, the preferable example include gluconolactone.

Content of the above saccharides is preferably from 0.1 weight % to 40 weight % of ink composition, and preferably 0.5 weight % to 30 weight %.

Ratio of the pigment to the wetting agent has a great effect on the ejection stability of the ink from the head. High pigment solid content with minute blending of the wetting agent may accelerate moisture evaporation in the vicinity of ink meniscus of the nozzle, thus causing ejection failure.

Blending of the wetting agent is preferably from 10 weight % to 50 weight %. On the other hand, content of the polymer fine particle containing the coloring material is 8 weight % or more, and preferably 8 weight % to 20 weight %. With this, the ratio of the wetting agent to the polymer fine particle (solid content) is 0.5 to 6.25, more preferably 2.0 to 6.0, and most preferably 3.0 to 5.0. The ink within the above range may bring about favorable results in dryness test, preservability test, and reliability test.

In terms of the wetting agent and the water-soluble organic solvent, the ink under the present invention uses the water as liquid medium. For the purpose of making a desired material property of the ink, preventing dryness of the ink, and improving dispersion stability, the following organic solvents are to be used, which can be combined.

Specific examples of the water-soluble organic solvent include the following:

polyhydric alcohols (third hydroxy compound), other than the first hydroxy compounds and the second hydroxy compounds described above, such as ethylene glycol, 1,3-propane diol, 1,4-butane diol, 2,3-butane diol, 2-methyl-2,4-pentane diol, tripropylene glycol, tetraethylene glycol, hexylene glycol, polyethylene glycol, polypropylene glycol, 1,2,6-hexane triol, 1,2,4-butane triol, 1,2,3-butane triol, thiodiglycol, pentaerythritol, and the like;

polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether, and the like;

polyhydric alcohol aryl ethers such as ethylene glycol monophenyl ether, ethylene glycol monobenzil ether, and the like;

nitrogen-contained heterocyclic ring compounds (lactams) such as 2-pyrrolidone, N-methyl-2-pyrrolidone, N-hydroxyethyl-2-pyrrolidone, 1,3-dimethyl imidazolidinone, ε-caprolactam, γ-butyrolactone, and the like;

amides such as formamide, N-methyl formamide, N,N-dimethyl formamide, and the like;

amines such as monoethanol amine, diethanol amine, triethanol amine, monoethyl amine, diethyl amine, triethyl amine and the like; and sulfur-contained compounds such as dimethyl sulfoxide, sulfolane, thiodiethanol, and the like;

propylene carbonate; ethylene carbonate; and the like.

Among the above organic solvents, especially preferable are thiodiethanol, polyethylene glycol 200 to 600, 1,2,6-hexane triol, 1,2,4-butane triol, 2-pyrrolidone, N-methyl-2-pyrrolidone. The above organic solvents may bring about an excellent effect for preventing injection failure which may be caused by solubility and moisture-evaporation.

Under the present invention, carbamides and alkylglycines may be contained when necessary. The examples of the carbamides include urea, thiocarbamide, ethylene carbamide, 1,3-dimethyl-2-imidazolidinone, and the like. The examples of the alkylglycines include N-ethylglycine, N,N-dimethyl glycine, N-ethylglycine, and the like. The carbamides and the alkylglycines basically can keep an excellent humidity property (leading to improved preservability) in the aqueous ink, and present an excellent effect in ejection stability and clogging prevention of the recording head of the ink-jet printer. Moreover, the carbamides and the alkylglycine can extensively adjust the ink viscosity and surface tension, and be excellent in the clogging prevention, thus preventing the cloggings of the head and the ejection failure (such as curved ejection of the ink droplet). The carbamides and the alkylglycine are preferably added to the ink generally by an amount of 0.5 weight % to 50 weight %, preferably 1 weight % to 20 weight %. Less than 0.5 weight % above cannot meet the required property of the recording head of the ink-jet printer, while more than 50 weight % above may increase viscosity to thereby cause a harmful effect on the ink's preservability and cause the ink's ejection failure.

The surfactant used is anionic, nonionic, or amphoteric. A fluorine surfactant is to be used in combination. Based on combinations of types of coloring materials, the wetting agents, and the water-soluble organic solvent, the surfactant is to be selected such that the dispersion stability is not lost.

The examples of the anionic surfactant include salts such as polyoxyethylene alkylether acetate, dodecylbenzene sulfonate, salt of lauryl acid, polyoxyethylene alkylether sulfate, and the like.

Table 1 shows surfactants (I) and surfactants (II) of free acid type expressed specifically by free acids.

TABLE 1

| | |
|---|---|
| $CH_3(CH_2)_{12}O(CH_2CH_2O)_3CH_2COOH$ | (I-1) |
| $CH_3(CH_2)_{12}O(CH_2CH_2O)_4CH_2COOH$ | (I-2) |
| $CH_3(CH_2)_{12}O(CH_2CH_2O)_5CH_2COOH$ | (I-3) |
| $CH_3(CH_2)_{12}O(CH_2CH_2O)_6CH_2COOH$ | (I-4) |
| $CH_3(CH_2)_{11}CHO(CH_2CH_2O)_6CH_2COOH$<br>$\quad\;\;|$<br>$\quad\;CH_3$ | (I-5) |
| $CH_3(CH_2)_6$<br>$\qquad\searrow$<br>$\qquad\quad CHO(CH_2CH_2O)_3CH_2COOH$<br>$\qquad\nearrow$<br>$CH_3(CH_2)_5$ | (I-6) |
| $\qquad\qquad\quad CH_3 \;\;\;\; CH_3$<br>$\qquad\qquad\quad\; |\qquad\;\;\;\;\; |$<br>$\qquad CH_2COOCHCH_2CHCH_3$<br>$\qquad\quad\; |$<br>$HO_3S—CHCOOCHCH_2CHCH_3$<br>$\qquad\qquad\quad\; |\qquad\;\;\;\;\; |$<br>$\qquad\qquad\quad CH_3 \;\;\;\; CH_3$ | (II-1) |
| $\qquad\qquad\quad CH_3$<br>$\qquad\qquad\quad\; |$<br>$\qquad CH_2COOCHCH_2CH_2CH_3$<br>$\qquad\quad\; |$<br>$HO_3S—CHCOOCHCH_2CH_2CH_3$<br>$\qquad\qquad\quad\; |$<br>$\qquad\qquad\quad CH_3$ | (II-2) |
| $\qquad\qquad\quad CH(CH_3)_2$<br>$\qquad\qquad\quad\; |$<br>$\qquad CH_2COOCHCH(CH_3)_2$<br>$\qquad\quad\; |$<br>$HO_3S—CHCOOCHCH(CH_3)_2$<br>$\qquad\qquad\quad\; |$<br>$\qquad\qquad\quad CH(CH_3)_2$ | (II-3) |
| $\qquad CH_2COOCH_2CH_2CH(CH_3)_2$<br>$\qquad\quad\; |$<br>$HO_3S—CHCOOCH_2CH_2CH(CH_3)_2$ | (II-4) |

The examples of the nonionic surfactant include polyoxyethylene alkylether, polyoxypropylene polyoxyethylene alkyl ether, polyoxyethylene alkylester, polyoxyethylene sorbitan fatty acid ester, polyoxyethylene alkyl phenyl ether, polyoxyethylene alkylamine, polyoxyethylene alkylamide, and the like.

The examples of the acetylene glycol surfactant include acetylene glycols such as 2,4,7,9-tetramethyl-5-decin-4,7-diol, 3,6-dimethyl-4-octyne-3,6-diol, 3,5-dimethyl-1-hexine-3-ol. The examples of the acetylene glycols include Surfynol 104, Surfynol 82, Surfynol 465, Surfynol 485, and Surfynol TG (made by AIR PRODUCTS, U.S.A.), especially Surfynol 465, Surfynol 104 and Surfynol TG show a good printing quality.

The examples of the amphoteric surfactant include salt of lauryl amino propionic acid, lauryl dimethyl betaine, stearyl dimethylbetaine, lauryl dihydroxyethyl betaine, and the like.

Specific exemplas are shown below, but are not limited thereto.

Lauryl dimethylamine oxide, myristyl dimethylamine oxide, stearyl dimethylamine oxide, dihydroxyethyl laurylamine oxide, polyoxyethylene coconut oil alkyldimethylamine oxide, dimethyl alkyl (coconut) betaine, dimethyl lauryl betaine, and the like.

The examples of the fluorine surfactant include perfluoroalkyl sulfonate, perfluoroalkyl carboxylate, perfluoroalkyl phosphoric acid ester, perfluoroalkyl ethylene oxide adduct, perfluoroalkyl betaine, perfluoroalkyl amineoxide compound, and the like. Commercially available as the fluorine compound are Surflon S-111, Surflon S-112, Surflon S-113, Surflon S-121, Surflon S-131, Surflon S-132, Surflon S-141, and Surflon S-145 (available from Asahi Glass); Fluorad FC-93, Fluorad FC-95, Fluorad FC-98, Fluorad FC-129, Fluorad FC-135, Fluorad FC-170C, Fluorad FC-430, and Fluorad FC-431 (available from Sumitomo 3M); and the like. Especially, FPT110, FT-250, FT-251, and FT-400S (made by NEOS) can bring about a good printing quality, particularly improving coloring property remarkably.

The surfactants can be used alone or in combination of two or more.

Use of the surfactant under the present invention can improve wetting property to the record paper. The examples of preferable surfactants include polyoxy ethylene alkyl ether acetate, dialkyl sulfosuccinate containing branched alkyl group having 5 to 15 carbon atoms, polyoxy ethylene alkyl ether, polyoxy propylene polyoxy ethylene alkyl ether, polyoxy ethylene alkyl phenyl ether, polyoxy ethylene polyoxy propylene block copolymer, acetylene glycol, and the like. More specifically, as the anionic surfactant, use of (I) polyoxyethylene alkylether acetate and/or (II) dialkyl sulfosuccinate having branched alkyl chain having 5 to 7 carbon chains can improve plain paper property and obtain solubility and dispersion stability of the coloring agent.

$$R_1—O—(CH_2CH_2O)mCH_2COOM \qquad (I)$$

($R_1$ denotes a branchable alkyl group having 6 to 14 carbon atoms, m denotes an integer of 3 to 12, M denotes an alkali metal ion, a quaternary ammonium, a quaternary phosphonium, and an alkanolamine.)

$$\begin{array}{c} CH_2COO—R_2 \\ | \\ MO_3S—CHCOO—R_2 \end{array} \qquad (II)$$

($R_2$ denotes a branched alkyl group having 5 to 16 carbon atoms, M denotes an alkali metal ion, a quaternary ammonium, a quaternary phosphonium, and an alkanolamine.)

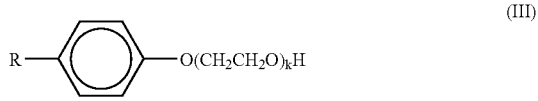

(III)

(R denotes a branchable carbon chain having 6 to 14 carbon atoms, and k denotes an integer of 5 to 20.)

$$R—(OCH_2CH_2)nOH \qquad (IV)$$

(R is a branchable carbon chain having 6 to 14 carbon atoms, and n denotes an integer of 5 to 20.)

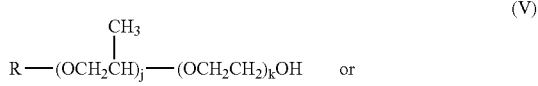

(V)

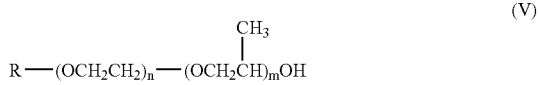

(V)

(R denotes a branchable carbon chain having 6 to 14 carbon atoms j, k, m, and n denote integer of 1 to 20.)

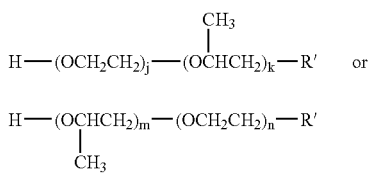
(VI)

(R' denotes a carbon chain having 6 to 14 carbon atoms, j, k, m, and n denote integer of 1 to 20.

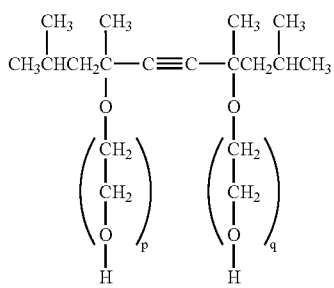
(VII)

(p and q are integers of 0 to 40.)

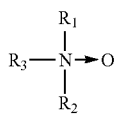
(VIII)

(Each of $R_1$ and $R_2$ denotes an alkyl group having 1 to 3 carbon atoms or a hydroxyalkyl group having 1 to 3 carbon atoms. $R_3$ denotes an alkyl group having 10 to 20 carbon atoms or an alkenyl group having 10 to 20 carbon atoms.)

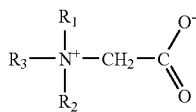
(IX)

(Each of $R_1$ and $R_2$ denotes an alkyl group having 1 to 3 carbon atoms or a hydroxyalkyl group having 1 to 3 carbon atoms. $R_3$ denotes an alkyl group having 10 to 16 carbon atoms, where $R_3$ is allowed to contain an amide group. Otherwise, $R_3$ is an alkyl group derived from a coconut oil.)

Especially under the present invention, a perfluoroalkyl sulfonate expressed by the following formula is used for the fluorine surfactant, thereby obtaining a good printing quality especially coloring property and improving remarkably uniform dying property to the paper. The examples of the following perfluoroalkyl sulfonate include those having a combination ($R_1$, $R_2$, and $R_3$) of $C_3F_7$—, $CF_3$—, F—, or $C_4F_9$—, F, F, and having M1 that is Na.

Preferably used is FPT110 (available from NEOS).

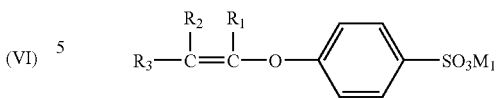

($R_1$, $R_2$, and $R_3$ denote one of a perfluoro alkyl group and a fluorine atom, and M1 denotes any one of Li, Na, and K.)

Using lithium ion, quaternary ammonium, and quaternary phosphonium (the latter two of which expressed by the following formula), as a counter ion of the surfactant under the present invention, can present an excellent solubility stability of the surfactant.

The examples of preferable nonion surfactants include a formula (III) expressing polyoxy ethylene alkyl phenyl ether, a formula (IV) expressing polyoxy ethylene alkyl ether, a formula (V)expressing polyoxy propylene polyoxy ethylene alkyl ether, a formula (VII) expressing acetylene glycol. Using the above anionic surfactants in combination can bring about a synergy effect such as permeability, thus decreasing color bleeding and character feathering of the ink. The above surfactant can be used alone or in combination of one or more.

Combining the fluorine surfactant with the formula (IV) expressing polyoxy ethylene alkyl ether, and combining the fluorine surfactant with the formula (V) expressing polyoxy propylene polyoxy ethylene alkyl ether can remarkably improve permeability, thus decreasing the color bleeding, improving coloring property, and decreasing the character feathering.

Setting the ink's pH at 6 or more can bring about ink's preservability. In so many occasions, the copy paper and the like used in the office has pH of 5 to 6. Recording on so-called a plain paper in the following method can provide a record image having high quality and high resolution: discharging the ink to the record paper from a minor ejection port of 9 μm to 60 μm thus causing a droplet of 3 ng by weight to 5 ng by weight at a rate of 5 m/s to 20 m/s, the amount of monochromatic adhesion set at 1.5 g/m$^2$ to 30 g/m$^2$, Steckigt sizing degree of 3 seconds or more in the test method of JIS P-8122. pH of 9 or more hereinabove is likely to cause material change attributable to decomposition when an active agent expressed by the formula (II) is used at preservation. For use of the active agent expressed by the formula (II), it is preferable to set pH at 6 to 9.

The amount of the additives expressed by (I), (II), (III), (IV), (V), (VI), (VII), (VIII), and (IX) is in a range from 0.05 weight % to 10 weight %, giving a desired permeability to the ink's property required by the printer system. 0.05 weight % or less in each case hereinabove, may cause the color bleeding to a boundary between two overlapped colors, while 10 weight % or more in each case hereinabove is likely to cause deposition of the compound itself at low temperature thus decreasing reliability.

Use of the above surfactant (I) to (IX) in combination with the fluorine surfactant can reduce the amount of the added fluorine surfactant. With an addition between 0.05 weight % to 5 weight %, the fluorine surfactant can give to the ink a desired permeability required by the printer system. 0.05 weight % in each case hereinabove cannot cause a remarkable effect for improving the permeability. On the other hand, 5 weight % or more in each case hereinabove may increase viscosity and cause cohesion and the like at high preservation temperature, thus decreasing reliability. The amount of added fluorine surfactant of 0.1 weight % to 2 weight % is preferable, in view of preservability.

The surface tension under the present invention is an index of permeability into the paper, especially denoting a dynamic surface tension at a short time of 1 second or less after formation of the surface, which is different from a static surface tension measured at a saturation time. JP-A No. 63-31237 discloses a conventional method for measuring a dynamic surface tension of 1 second or less, which method is applicable to the present invention. Under the present invention, however, Wilhelmy surface tension tester which is of a suspension type was used for measurement. The surface tension is preferably 40 mJ/m$^2$ or less, and more preferably 35 mJ/m$^2$ or less for an excellent fixing property and dryness.

Under the present invention, the polyol or the glycol ether has 8 to 11 carbon atoms. Adding a partly-soluble polyol and/or glycol (namely, solubility of 0.1 weight % to less than 4.5 weight % in water of 25° C.) by 0.1 weight % to 10.0 weight % relative to a total weight of the recording ink can improve the ink's wetting property to a thermal element, thus bringing about ejection stability and frequency stability even with a small amount of additives.
(1) 2-ethyl-1,3-hexanediol Solubility: 4.2% (at 20° C.)
(2) 2,2,4-trimethyl-1,3-pentanediol Solubility: 2.0% (at 20° C.)

In the water of 25° C., a penetrant having solubility of 0.1 weight % to less than 4.5 weight % can bring about an advantage that the penetration property is very high, due to the low solubility. Thus, in the water of 25° C., it is possible to make an ink with a very high penetration property by combining the penetrant having solubility of 0.1 weight % to 4.5 weight % with other solvent or with other surfactant(s).

The ink under the present invention may be added by a conventional additive other than the coloring agent, the solvent and the surfactant described above.

The examples of preservatives (corrosion and mold) include sodium dehydroacetate, sodium sorbate, 2-pyridinethiol-1-oxide sodium, sodium benzoate, parachlorophenol sodium, and the like.

The examples of pH regulators include arbitrary substances capable of regulating pH to 7 or more without causing a harmful effect on the ink thus regulated.

The examples of pH regulator include amines such as diethanol amine, triethanol amine, and the like; hydrides of alkali metal elements such as lithium hydroxide, sodium hydroxide, potassium hydroxide, and the like; ammonium hydroxide; quaternary ammonium hydroxide; quaternary phosphonium hydroxide; carbonates of alkali metal such as lithium carbonate, sodium carbonate, potassium carbonate, and the like; and the like.

The examples of chelate reagent include ethylene diamine quaternary sodium acetate, sodium nitrilotriacetic acid, hydroxyethyl ethylene diamine trisodium acetate, diethylene triamine penta acetic acid sodium, disodium acetate uramil, and the like.

The examples of rustproof agent include acid sulfite, thiosodium sulfate, ammonium thiodiglycolate, diisopropyl ammonium nitrite, pentaerythritol tetranitrate, dicyclohexyl ammonium nitrite, and the like.

Depending on the purpose, soluble ultraviolet absorbent, soluble infrared absorbent, and the like can be added.

Described below is the ink-set under the present invention.

The ink-set includes a black ink and a color ink. The color ink contains the polymer emulsion which contains the above coloring material. The black ink has a structure in which the polymer emulsion constituting the color ink is replaced with a self-dispersion type carbon black. More specifically, in an ink-jet recording ink set comprising a black ink and at least one color ink, the black ink contains the self-dispersion type pigment; at least one type of wetting agent selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane (first hydroxy compound); polyol (second hydroxy compound) having 8 to 11 carbon atoms or glycol ether having 8 to 11 carbon atoms; at least one of an anionic surfactant, a nonion surfactant, and an amphoteric surfactant; water-soluble organic solvent; and water. Moreover, the ink set has the ink's viscosity of 5 mPa.sec or more at 25° C. The color ink contains the polymer emulsion which contains the coloring material which is insoluble in water or unlikely to dissolve in water. The color ink contains at least one wetting agent (first hydroxy compound) selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane; polyol (second hydroxy compound) having 8 to 11 carbon atoms or glycol ether having 8 to 11 carbon atoms; water-soluble organic solvent; water; at least one of an anionic surfactant, a nonion surfactant, and an amphoteric surfactant; and at least one type of fluorine surfactant. The ink-jet recording ink set has the ink's viscosity of 5 mPa.sec or more at 25° C.

The black ink comprises the following constitutional elements.
(i) Self-dispersion type carbon black
(ii) Wetting agent 1-i (glycerin)
(iii) Wetting agent 1-ii (at least one type selected from the group consisting of 1,3-butanediol, triethylene glycol, 1,6-hexanediol, propylene glycol, 1,5-pentanediol, diethylene glycol, dipropylene glycol, trimethylol propane, and trimethylol glycol ethane; first hydroxy compound)
(iv) Water-soluble organic solvent
(v) Surfactant
(vi) Polyol (a second hydroxy compound) having 8 to 11 carbon atoms or glycol ether having 8 to 11 carbon atoms
(vii) Emulsion
(viii) Preservative
(ix) pH regulator
(x) Pure water As the coloring material, the self-dispersion type color pigment is to be used in which at least one type of hydrophilic group can stably disperse directly on a surface of the carbon black or coupled to the surface f the carbon black via other atomic group(s), without using a dispersing agent. As a result, like the conventional ink, the coloring agent under the present invention does not need the dispersing agent for dispersing the carbon black. The self-dispersion type carbon black under the present invention is preferred to have an ionicity, namely, those charged anionic or cationic are preferable.

The examples of the anionic hydrophilic group include —COOM, —SO$_3$M, —PO$_3$HM, —PO$_3$M$_2$, —SO$_2$NH$_2$, and —SO$_2$NHCOR (M in the above formulas denotes hydrogen atom, alkali metal, ammonium, or organic ammonium; and R in the above formulas denotes alkyl group having 1 to 12 carbon atoms, phenyl group allowed to have substitutional group, or naphthyl group allowed to have substitutional group), and the like. Under the present invention, use of those having —COOM and —SO$_3$M coupled to the surface of the color pigment is preferable.

The examples of "M" in the above hydrophilic group as alkali metal include lithium, sodium, potassium, and the like; as organic ammonium include monomethyl ammonium to trimethyl ammonium, monoethyl ammonium to triethyl ammonium, monomethanol ammonium to trimethanol ammonium, and the like. The examples of a method of obtaining color pigment charged anionic, in this case, a method of introducing —COOM to the surface of the color pigment include oxidization of the color pigment with hypochlorous acid soda, sulfonation, reaction of diazonium salt, but not limited thereto.

The examples of the cationic hydrophilic group include preferably quaternary ammonium group, more preferably the quaternary ammonium groups shown in the following table 2. Under the present invention, any of those shown below and coupled to the surface of the carbon black is preferably used as the coloring material.

TABLE 2

| $NH_3^+$ | $NR_3^+$ |
|---|---|
| ![benzene-N+-CH3] | ![pyridinium-CH3] |
| ![benzene-N+-C2H5] | ![pyridinium-C2H5] |
| ![benzene-+N(CH3)3] | |
| ![benzene-CH2-+N(CH3)3] | |
| ![benzene-COCH2-+N(CH3)3] | |
| ![benzene-+N-pyridine] | |
| ![benzene-COCH2-+N-pyridine] | |

(R in the above formulas denotes alkyl group with or without substitution, or aryl group with or without substitution)

The examples of producing the cationic self-dispersion type carbon black coupled with the hydrophilic group as described above include, as a method of coupling N-ethyl pyridyl group having the following structure, treatment of carbon black with 3-amino-N-ethyl pyridium bromide, but not limited thereto.

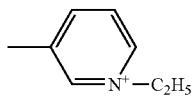

Under the present invention, the hydrophilic group described above may be coupled to the surface of the carbon black via other atomic group. The examples of the other carbon groups include alkyl group having 1 to 12 carbon atoms, phenyl group allowed to have substitutional group, and naphthyl group allowed to have substitutional group. Specific examples of the above hydrophilic group coupled to the surface of the carbon black via the other atomic group include —$C_2H_4COOM$, —$PhSO_3M$, —$C_5H_{10}NH_3^+$ (M in the above formulas denotes hydrogen atom, alkali metal, ammonium, and organic ammonium), and the like, but not limited thereto.

The self-dispersion type carbon black used for the black ink of the ink set under the present invention is charged cationic or anionic depending on the hydrophilic group of the surface of the carbon black, has water-dispersion property by reaction of the ion, is improved in hydrophilic property by the hydrophilic group. With this, even a long-time rest can bring about an aqueous pigment ink which can be stably dispersed in the water medium without increasing the particle diameter or viscosity of the pigment. The black ink having a polarity that is opposite to the polarity of the color ink constituting the ink set can bring about the smallest amount of color bleedings. Under the present invention, however, the ink has high viscosity and low surface tension and is excellent in permeability. With this, even when the color ink and black ink of the ink set have the same polarity, a minute amount of bleeding may occur, thus preventing an excessive cohesion and increased viscosity even when the inks are mixed in the nozzle's maintenance mechanism or on the nozzle plate. This means the ink set under the present invention is excellent in handling property.

Among the other constitutional materials used for the black ink of the ink set, those used for the ink that contains the polymer fine particle containing the coloring material are usable.

A resin emulsion is preferably proposed as the one usable only for the black ink.

A resin emulsion means an emulsion that has its continuous phase as water, and has its dispersion phase including the following resin compositions. The examples of the resin compositions of the dispersion phase include acrylic resin, vinyl acetate resin, styrene-butadiene resin, vinyl chloride resin, acryl-styrene resin, butadiene resin, styrene resin, and the like.

According to the preferable aspect of the present invention, the resin is preferred to be a polymer which is a combination of a hydrophilic part and a hydrophobic part. Particle diameter of the resin composition, as long as the emulsion can be formed, is not particularly limited, but preferably about 150 nm or less, and more preferably 5 nm to 100 nm.

The resin emulsion can be obtained by mixing the resin particle in water, or by mixing the resin particle and the surfactant in water.

For example, an emulsion of acrylic resin is obtained by:
mixing (meth)acrylic ester in water,
or mixing (meth)acrylic ester and surfactant in water,
And an emulsion of styrene-acryl resin is obtained by:
mixing (meth)acrylic ester and styrene in water.

A preferable ratio of mixture of resin composition to surfactant is ordinarily 10:1 to 5:1. Use of the surfactant less than the above range is unlikely to form the emulsion, while more than the above range is likely to decrease waterproof of the ink or deteriorate permeability.

Ratio of resin to water, as dispersion phase components of the emulsion, is 60 to 400 weight part of water relative to 100 weight part of resin, and preferably 100 to 200 weight part of water relative to 100 weight part of resin.

The examples of commercially available resin emulsions include Micro Gel E-1002 and Micro Gel E-5002 (styrene-acryl resin emulsion made by Nippon Paint), VONCOAT 4001 (acryl resin emulsion made by Dainippon Ink and Chemicals Incorporated), VONCOAT 5454 (styrene-acryl resin emulsion made by Dainippon Ink and Chemicals Incorporated), SAE-1014 (styrene-acryl resin emulsion made by ZEON CORPORATION), Sybynol SK-200 (acryl resin emulsion made by Saiden Chemical Industry Co., Ltd.), and the like.

The ink under the present invention is preferred to contain the resin emulsion having its resin composition of 0.1 weight % to 40 weight % relative to the ink, and more preferably 1 weight % to 25 weight %.

The resin emulsion has properties of increased viscosity and cohesion, suppresses penetration of coloring composition, and promotes fixation to the record material. Moreover, some types of the resin emulsions may form a coat on the record material, thereby improving friction resistance of the print.

Hereinafter described referring to drawings is a recording liquid cartridge receiving therein a recording liquid and an ink-jet printer equipped with the recording liquid cartridge, under the present invention.

Constitutional examples shown below are not limited thereto, under the present invention.

FIG. 1 is a schematic front view of a mechanism part of a serial ink-jet printer which incorporates therein an ink cartridge equipped with a recording liquid receiver receiving therein a recording liquid, under the present invention.

The mechanism part of the ink-jet printer has the following constitution: Between a side plate (1) and a side plate (2), a main guide rod (3) and a follower guide rod (4) are horizontally suspended substantially horizontally. By means of the main guide rod (3) and the follower guide rod (4), a carriage unit (5) is born in such a manner as to slide in a main scanning direction. The carriage unit (5) incorporates therein four ink-jet heads (6) respectively ejecting a yellow ink (Y), a magenta ink (M), a cyan ink (C), and a black ink (Bk), with ejection faces (6a) (nozzle face whose ink-repellent coating layer was subjected to a eutectoid treatment) thereof turning downward. On an upper side of the ink-jet heads (6) of the carriage unit (5), respectively, four ink cartridges ((7y), (7m), (7c), (7k)) are replaceably installed. The ink-jet head (6) has a preferable nozzle diameter of 30 μm or less.

The carriage unit (5) has such a constitution that driving and controlling a main scanning motor (8) connected to a timing belt (11) tensed between a driving pulley (driving timing pulley) (9) (which is rotated with the main scanning motor (8)) and a follower pulley (idler pulley) (10) can move the carriage unit (5) and the four ink-jet heads (6) in the main scanning direction.

A sub-frame (13) and a sub-frame (14) stand on a base plate (12) connecting the side plate (1) and the side plate (2). Between the sub-frame (13) and the sub-frame (14), a conveyer roller (15) is rotatably born for conveying a paper sheet (16) in a sub-scanning direction perpendicular to the main scanning direction. A sub-scanning motor (17) is disposed beside the sub-frame (14). For conveying a rotation of the sub-scanning motor (17) to the conveyer motor (15), there are provided a gear (18) fixed to a rotary shaft of the sub-scanning motor (17) and a gear (19) fixed to a shaft of the conveyer roller (15).

Moreover, between the side plate (1) and the sub-frame (13), there is provided a reliability maintaining-recovering mechanism (hereinafter referred to as "sub system") (21) of the ink-jet head (6). A holder (23) holds four cap members (22) for respectively capping the ejection faces of the ink-jet heads (6). The holder (23) is swingably held with a link member (24). Moving the carriage unit (5) in the main scanning direction such that the carriage unit (5) abuts on an engagement portion (25) disposed on the holder (23) can lift the holder (23) in accordance with the movement of the carriage unit (5), thereby the cap members (22) may cap the ejection faces (6a) of the ink-jet heads (6). On the contrary, moving the carriage unit (5) to a printing area side may lower the holder (23) in accordance with the movement of the carriage unit (5), thereby the cap members (22) may be spaced apart from the ejection faces (6a) of the ink-jet heads (6).

Each of the cap members (22) connects to an absorption pump (27) by way of an absorption tube (26). Moreover, the cap member (22) formed with an atmospheric opening communicates to an atmosphere by way of an atmospheric opening tube and an atmospheric opening valve. Moreover, a waste liquid pumped by the absorption pump (27) is drained to a waste liquid preservation tank (not shown) by way of a drain tube and the like. On a side of the holder (23), a wiper blade (28) is mounted to a blade arm (29). The wiper blade (28) is a wiping member made of an elastic material such as fiber member, bubbling member, rubber, and the like. The blade arm (29) is so born as to be swingable with a cam which is rotated by means of a driving member (not shown).

Described next referring to FIG. 2 and FIG. 3 is about the ink-jet cartridge (7).

FIG. 2 is an external perspective view of the ink cartridge before being incorporated into the printer under the present invention. FIG. 3 is a cross section of the ink cartridge under the present invention.

As is seen in FIG. 3, the ink cartridge (7) has a cartridge body (41) receiving therein an ink absorbent (42) absorbing therein the in of specific color. The cartridge body (41) is so formed that an upper cover member (44) is adhered or welded to an upper opening of a case (43), and is a mold which is made, for example, by resin. The ink absorbent (42) is made of porous body such as urethane foam and the like. After being compressively inserted in the cartridge body (41), the ink absorbent (42) may absorb the ink.

The case (43) of the cartridge body (41) has a base portion which is formed with an ink supply port (45) for feeding the ink to the recording head (6). The ink supply port (45) has an inner periphery to mating with a seal ring (46). The upper cover member (44) is formed with an atmospheric opening (47).

A cap member (50) is mounted to the cartridge body (41). The cap member (50) may prevent leak of the inside ink which leak may be caused by a compressive deformation of the case (43) in the following state: i) before loading and when the ink supply port (45) is blocked, handling the ink-jet cartridge (7) for loading or transportation, or ii) when a pressure is applied to a wide sidewall during vacuum packing.

As is seen in FIG. 2, the atmospheric opening (47) is sealed by sealing to the upper cover member (44) a film-shaped seal member (55) which has oxygen permeability of 100 ml/m$^2$ or more. The seal member (55) has such a dimension as to seal the atmospheric opening (47) and a plurality of grooves (48) which are formed around the atmospheric opening (47). Sealing the atmospheric opening

(47) with the seal member (55) having the oxygen permeability of 100 ml/m² or more may bring about the following effect:

Effect)

Even in the following state i), with the cartridge (7) packed under a decreased pressure using a pack member made of an aluminum laminate film and the like that is free from air permeability, and with the ink being loaded:

state i) an atmosphere present in a space (A) (see FIG. 3) that is formed between the ink absorbent (42) and the cartridge body (41) causes air to be dissolved in the ink;

the air in the ink can be exhausted via the seal member (55) to a space (between the cartridge body (41) and the pack member which is disposed outside the cartridge body (41)) having a high degree of vacuum, thus improving degassing of the ink.

FIG. 4 shows a constitutional example of a record cartridge which is provided with an ink receiver (receiving therein the recording liquid (ink)) and a head portion for ejecting the recording liquid.

Specifically, a record unit (30) is of a serial type, which includes main elements such as an ink-jet head (33), an ink tank (49) for receiving therein the recording liquid fed to the ink-jet head (33), and a cover member for sealing an inner part of the ink tank (49). The ink head (33) is formed with a plurality of nozzles (32) for ejecting the recording liquid. The ink (recording liquid) is led to a common liquid chamber (not shown) by way of an ink supply tube (not shown), and is to be ejected from the nozzle (32) in accordance with an electric signal from a record device body which signal is inputted from an electrode (31). The record unit of the above type is referred to as so-called thermal type or bubble type which can be produced at low cost due to its constitution, namely, a constitution suitable for the head that has its driving source of thermal energy.

The ink under the present invention, with the above compositions added thereto in the printing method such as the above bubble type, thermal type and the like, can improve wetting property to a thermal element. With this, even a small amount of addition of the above components can bring about the ejection stability and frequency stability, and increase safety, which is preferable. Moreover, the ink under the present invention is also suitable for a printing method that uses, for ejecting the ink, a dynamic energy instead of the thermal energy.

Described hereinabove is the serial type ink-jet record device. The recording liquid under the present invention is also applicable to a record device having so-called a line head, in which the nozzles are arranged arbitrarily in such a manner as zigzag where the nozzles are arranged as wide as or wider than the recording medium by integrating the density equal to the target image resolution or several fractions (for example, ½ to ⅛) of the target image resolution.

The record device herein is not limited to an output printer for PC, digital camera and the like, but can be a multifunctional machine including fax, scanner, telephone, and combination thereof.

Hereinafter described are specific examples of the present invention. The present invention is, however, not limited to these. In the examples, composition (%) is based on weight.

PREPARATION EXAMPLE 1

Prepare Polymer Fine Particle Dispersion Containing Phthalocyanine Pigment:

Referring to the preparation example disclosed in JP-A No. 2001-139849, the following added preparation was performed.

At first, inside of a 1 L of flask equipped with a mechanical stirrer, a thermometer, a nitrogen gas introducing tube, a reflux tube, and a droplet funnel was sufficiently substituted with a nitrogen gas, to thereby prepare a polymer solution. Then, styrene 11.2 g, acrylic acid 2.8 g, lauryl methacrylate 12.0 g, polyethylene glycol methacrylate 4.0 g, styrene macromer (AS-6 made by Toagosei Co., Ltd.) 4.0 g, and mercapto ethanol 0.4 g were introduced and heated to 65° C. Then, a mixture of styrene 100.8 g, acrylic acid 25.2 g, lauryl methacrylate 108.0 g, polyethylene glycol methacrylate 36.0 g, hydroxyethyl methacrylate 60.0 g, styrene macromer (AS-6 made by Toagosei Co., Ltd.) 36.0 g, mercapto ethanol 3.6 g, azobis dimethyl valeronitrile 2.4 g, and methyl ethyl ketone 18 g was dropped in the flask for 2.5 hours.

After completion of the drop, a mixture of azobis dimethyl valeronitrile 0.8 g and methyl ethyl ketone 18 g was dropped in the flask for 0.5 hours. After maturing it for 1 hour at 65° C., azobis dimethyl valeronitrile 0.8 g was added, followed by a further maturing for 1 hour. After completion of the reaction, methyl ethyl ketone 364 g was added, to thereby obtain a polymer solution having density of 50%. Then, the polymer solution was partly dried and was measured by gel penetration chromatography (standard: polystyrene, solvent; tetrahydrofuran), to find a weight average molecular weight of 15000.

The thus obtained polymer solution 28 g, copper phthalocyanine pigment 26 g, 1 mol/L of potassium hydroxide solution 13.6 g, methyl ethyl ketone 20 g, and ion exchanged water 30 g were sufficiently stirred. Then, three roll mills (NR-84A made by Noritake Company) were used for mixing-kneading 20 times. The thus obtained paste was inputted in an ion exchange water 200 g, sufficiently stirred, then the methyl ethyl ketone and the water were distilled with an evaporator, to thereby obtain 20.0 weight % (solid content) of a blue polymer fine particle dispersion 160 g.

Measured with micro track UPA, the polymer fine particle has an average particle diameter (D 50%) of 93 nm.

PREPARATION EXAMPLE 2

Prepare Polymer Fine Particle Dispersion Containing Dimethyl Quinacridone Pigment:

The preparation example 1 was repeated except that the phthalocyanine pigment in the preparation example 1 was replaced with a pigment red 122, to thereby obtain a purple polymer fine particle dispersion. Measured with micro track UPA, the polymer fine particle has an average particle diameter (D 50%) of 127 nm.

PREPARATION EXAMPLE 3

Prepare Polymer Fine Particle Dispersion Containing Monoazo Yellow Pigment:

The preparation example 1 was repeated except that the phthalocyanine pigment in the preparation example 1 was replaced with a pigment yellow 74, to thereby obtain a yellow polymer fine particle dispersion. Measured with micro track UPA, the polymer fine particle has an average particle diameter (D 50%) of 76 nm.

PREPARATION EXAMPLE 4

Prepare Polymer Fine Particle Dispersion Containing Carbon Black:

The preparation example 1 was repeated except that the phthalocyanine pigment in the preparation example 1 was replaced with a carbon black (FW 100 made by Degussa AG), to thereby obtain a black polymer fine particle dispersion. Measured with micro track UPA, the polymer fine particle has an average particle diameter (D 50%) of 104 nm.

PREPARATION EXAMPLE 5

Prepare Carbon Black Dispersion Liquid 1 after Diazo Compound Treatment:

Carbon black 100 g (surface 230 m$^2$/g, DBP oil absorption 70 ml/100 g) and p-amino-N-benzoic acid 34 g were mixed and dispersed in water 750 g, then nitric acid 16 g was dropped therein, and then the mixture was stirred at 70° C. After 5 minutes, a solution of water 50 g with sodium nitrite 11 g dissolved therein was added. Another stirring for 1 hour. The thus obtained slurry was diluted to 10 times, and was subjected to a centrifugal treatment for removing coarse grains. pH was regulated to 8 to 9 with diethanol amine. An ultrafiltraion was carried out for desalinization-enrichment, to thereby obtain a carbon black dispersion liquid with its pigment density 15%. The thus obtained was polypropylene-filtered (0.5 µm), to thereby obtain a carbon black dispersion liquid 1. Measured with micro track UPA, the carbon black dispersion liquid 1 has an average particle diameter (D 50%) of 99 nm.

PREPARATION EXAMPLE 6

Prepare Carbon Black Dispersion Liquid 2 after Hypochlorous Acid Treatment:

A commercially-available acid carbon black 300 g (Monarch 1300 made by Cabot Corporation) having pH 2.5 was sufficiently mixed with water 1000 milliliter, then a hypochlorous acid soda (effective chlorine density 12%) 450 g was dropped therein, and then stirred for 8 hours at 100° C. to 105° C. Another hypochlorous acid soda (effective chlorine density 12%) 100 g was added to the liquid, followed by dispersion for 3 hours with a horizontal dispersing machine. The thus obtained slurry was diluted to 10 times with water, pH was regulated with lithium hydroxide, then an ultrafiltraion was carried out for desalinization-enrichment to electric conductivity of 0.2 mS/cm, to thereby obtain a carbon black dispersion liquid having pigment density of 15%. The thus obtained carbon black dispersion liquid was subjected to a centrifugal treatment for removing coarse grains, and then subjected to a nylon filter of 1 micron, to thereby obtain a carbon black dispersion liquid 2. Measured with micro track UPA, the carbon black dispersion liquid 2 has an average particle diameter (D 50%) of 95 nm.

PREPARATION EXAMPLE 7

Prepare Carbon Black Dispersion Liquid 3 after Sulfonation Treatment:

A commercially-available carbon black pigment 150 g (Printex #85 made by Degussa AG) was sufficiently mixed in sulfolane 400 ml, then slightly dispersed with a bead mill, then amidosu liric acid 15 g was added, to be followed by stirring for 10 hours at 140° C. to 150° C. The thus obtained slurry was inputted in ion exchange water 1000 ml, then subjected to a centrifugal treatment at 12000 rpm, to thereby obtain a carbon black wet cake with its surface treated. The thus obtained carbon black wet cake was again dispersed in ion exchange water 2000 ml, pH was regulated with lithium hydroxide, and then an ultrafiltraion was carried out for desalinization-enrichment, to thereby obtain a carbon black dispersion liquid with its pigment density of 10 weight %.

The thus obtained was nylon-filtered (1 µm), to thereby obtain a carbon black dispersion liquid 3. The carbon black dispersion liquid 3 has an average particle diameter of 80 nm.

PREPARATION EXAMPLE 8

Prepare Carbon Black Dispersion Liquid 4 (Cationic) after Diazo Compound Treatment:

The preparation example 5 was repeated except that the p-amino-N-benzoic acid in the preparation example 5 was replaced with N-(4-aminophenyl) pyridinium chloride, to thereby obtain a carbon black dispersion liquid 4.

EXAMPLE 1

An ink composition having the following prescription was prepared, and a lithium hydroxide 10% solution was used for regulating pH to 9. Then, a membrane filter having an average pore diameter of 0.8 µm was used for filtering, to thereby obtain an ink composition.

| | |
|---|---|
| Polymer fine particle containing phthalocyanine pigment (preparation example 1) | 8.0 weight % (solid content) |
| 1,3-butanediol | 22.5 weight % |
| Glycerol | 7.5 weight % |
| 2-pyrrolidone | 2.0 weight % |
| Formula (IV) (R:C12, n = 9) | 2.0 weight % |
| 2-ethyl-1,3-hexanediol | 2.0 weight % |
| FT-110 (FTERGENT, fluorine surfactant made by NEOS, Kobe Japan) | 0.5 weight % |
| PROXEL LV (preservative) | 0.2 weight % |
| Ion exchanged water | Balance |

EXAMPLE 2

With pH regulated to 9 by sodium hydroxide, the example 1 was repeated except that the following compositions were used, to thereby prepare an ink composition.

| | |
|---|---|
| Polymer fine particle containing dimethyl quinacridone pigment (preparation example 2) | 8.0 weight % (solid content) |
| 1,3-butanediol | 22.5 weight % |
| Glycerol | 7.5 weight % |
| N-methyl-2-pyrrolidone | 2.0 weight % |
| Unisafe A-LY (amphoteric surfactant made by NOF Corporation) | 2.0 weight % |
| 2,2,4-trimethyl-1,3-pentanediol | 2.0 weight % |
| FT-110 (made by NEOS) | 0.5 weight % |
| PROXEL LV (preservative) | 0.2 weight % |
| Ion exchanged water | Balance |

EXAMPLE 3

With pH regulated to 9 by lithium hydroxide, the example 1 was repeated except that the following compositions were used, to thereby prepare an ink composition.

| | |
|---|---|
| Polymer fine particle containing monoazo yellow pigment (preparation example 3) | 8.0 weight % (solid content) |
| 2-methyl-2,4-pentanediol | 22.5 weight % |
| Glycerol | 7.5 weight % |
| 2-pyrrolidone | 5.0 weight % |
| Active agent in formula (III) (R = C6, k = 5) | 2.0 weight % |

-continued

| | |
|---|---|
| 2,2,4-trimethyl-1,3-pentanediol | 2.0 weight % |
| FT-250 (made by NEOS) | 0.5 weight % |
| PROXEL LV (preservative) | 0.2 weight % |
| Ion exchanged water | Balance |

EXAMPLE 4

Black Pigment Ink

With pH regulated to 9 by sodium hydroxide, the example 1 was repeated except that the following compositions were used, to thereby prepare an ink composition.

| | |
|---|---|
| Polymer fine particle containing carbon black (preparation example 4) | 8.0 weight % (solid content) |
| Dipropylene glycol | 20.0 weight % |
| Glycerol | 10.0 weight % |
| N-hydroxyethyl-2-pyrrolidone | 2.0 weight % |
| Nissan anon BL-SF (amphoteric surfactant made by NOF Corporation) | 2.0 weight % |
| 2-ethyl-1,3-hexanediol | 2.0 weight % |
| FT-250 (made by NEOS) | 0.5 weight % |
| PROXEL LV (preservative) | 0.2 weight % |
| Ion exchanged water | Balance |

EXAMPLE 5

With pH regulated to 9 by lithium hydroxide, the example 1 was repeated except that the following compositions were used, to thereby prepare an ink composition.

| | |
|---|---|
| Polymer fine particle containing phthalocyanine pigment (preparation example 1) | 12.0 weight % (solid content) |
| 2,3-butanediol | 22.5 weight % |
| Glycerol | 7.5 weight % |
| N-methyl-2-pyrrolidone | 3.0 weight % |
| Formula (IV) (R:C12, n = 9) | 2.0 weight % |
| 2-ethyl-1,3-hexanediol | 2.0 weight % |
| FT-250 (made by NEOS) | 0.5 weight % |
| PROXEL LV (preservative) | 0.2 weight % |
| Ion exchanged water | Balance |

EXAMPLE 6

With pH regulated to 9 by lithium hydroxide, the example 1 was repeated except that the following compositions were used, to thereby prepare an ink composition.

| | |
|---|---|
| Polymer fine particle containing dimethyl quinacridone pigment (preparation example 2) | 12.0 weight % (solid content) |
| Dipropylene glycol | 15.0 weight % |
| Glycerol | 15.0 weight % |
| N-hydroxyethyl-2-pyrrolidone | 5.0 weight % |
| Formula (IV) (R:C12, n = 9) | 2.0 weight % |
| 2,2,4-trimethyl-1,3-pentanediol | 2.0 weight % |
| FT-110 (made by NEOS) | 0.5 weight % |
| PROXEL LV (preservative) | 0.2 weight % |
| Ion exchanged water | Balance |

EXAMPLE 7

With pH regulated to 9 by lithium hydroxide, the example 1 was repeated except that the following compositions were used, to thereby prepare an ink composition.

| | |
|---|---|
| Polymer fine particle containing monoazo yellow pigment (preparation example 3) | 12.0 weight % (solid content) |
| 1,3-propanediol | 22.5 weight % |
| 2-pyrrolidone | 5.0 weight % |
| Formula (V) (R:C10, j = 2, k = 7) | 2.0 weight % |
| 2-ethyl-1,3-hexanediol | 2.0 weight % |
| FT-251 (made by NEOS) | 0.5 weight % |
| PROXEL LV (preservative) | 0.2 weight % |
| Ion exchanged water | Balance |

EXAMPLE 8

With pH regulated to 9 by lithium hydroxide, the example 1 was repeated except that the following compositions were used, to thereby prepare an ink composition.

| | |
|---|---|
| Carbon black dispersion liquid 1 after diazo compound treatment (preparation example 5) | 8.0 weight % (solid content) |
| 1,3-butanediol | 22.5 weight % |
| Glycerol | 7.5 weight % |
| N-methyl-2-pyrrolidone | 2.0 weight % |
| Formula (V) (R:C10, j = 2, k = 10) | 2.0 weight % |
| 2,2,4-trimethyl-1,3-pentanediol | 2.0 weight % |
| FT-251 (made by NEOS) | 0.5 weight % |
| Emulsion | 3.0 weight % |
| PROXEL LV (preservative) | 0.2 weight % |
| Ion exchanged water | Balance |

EXAMPLE 9

With pH regulated to 9 by lithium hydroxide, the example 1 was repeated except that the following compositions were used, to thereby prepare an ink composition.

| | |
|---|---|
| Polymer fine particle containing phthalocyanine pigment (preparation example 1) | 15.0 weight % (solid content) |
| 1,6-hexanediol | 15.0 weight % |
| Glycerol | 15.0 weight % |
| N-hydroxyethyl-2-pyrrolidone | 2.0 weight % |
| Formula (V) (R:C10, j = 2, k = 7) | 2.0 weight % |
| 2-ethyl-1,3-hexanediol | 2.0 weight % |
| FT-250 (made by NEOS) | 0.5 weight % |
| PROXEL LV (preservative) | 0.2 weight % |
| Ion exchanged water | Balance |

EXAMPLE 10

With pH regulated to 9 by lithium hydroxide, the example 1 was repeated except that the following compositions were used, to thereby prepare an ink composition.

| | |
|---|---|
| Polymer fine particle containing dimethyl quinacridone pigment (preparation example 2) | 15.0 weight % (solid content) |
| 1,6-hexanediol | 22.5 weight % |
| Glycerol | 7.5 weight % |

-continued

| | |
|---|---|
| 2-pyrrolidone | 3.0 weight % |
| Formula (V) (R:C10, j = 2, k = 10) | 2.0 weight % |
| 2,2,4-trimethyl-1,3-pentanediol | 2.0 weight % |
| FT-250 (made by NEOS) | 0.5 weight % |
| PROXEL LV (preservative) | 0.2 weight % |
| Ion exchanged water | Balance |

EXAMPLE 11

With pH regulated to 9 by sodium hydroxide, the example 1 was repeated except that the following compositions were used, to thereby prepare an ink composition.

| | |
|---|---|
| Polymer fine particle containing monoazo yellow pigment (preparation example 3) | 15.0 weight % (solid content) |
| 2-methyl-2,4-pentanediol | 22.5 weight % |
| Glycerol | 7.5 weight % |
| N-methyl-2-pyrrolidone | 5.0 weight % |
| Formula (V) (R:C10, j = 2, k = 10) | 2.0 weight % |
| 2-ethyl-1,3-hexanediol | 2.0 weight % |
| FT-250 (made by NEOS) | 0.5 weight % |
| PROXEL LV (preservative) | 0.2 weight % |
| Ion exchanged water | Balance |

EXAMPLE 12

With pH regulated to 9 by sodium hydroxide, the example 1 was repeated except that the following compositions were used, to thereby prepare an ink composition.

| | |
|---|---|
| Carbon black dispersion liquid 2 after hypochlorous acid treatment (preparation example 6) | 10.0 weight % |
| 1,2,6-hexanetriol | 30.0 weight % |
| Glycerol | 10.0 weight % |
| N-hydroxyethyl-2-pyrrolidone | 5.0 weight % |
| Unisafe A-LY (amphoteric surfactant made by NOF Corporation) | 2.0 weight % |
| 2,2,4-trimethyl-1,3-pentanediol | 2.0 weight % |
| FT-110 (made by NEOS) | 0.5 weight % |
| Emulsion | 3.0 weight % |
| PROXEL LV (preservative) | 0.2 weight % |
| Ion exchanged water | Balance |

EXAMPLE 13

With pH regulated to 9 by sodium hydroxide, the example 1 was repeated except that the following compositions were used, to thereby prepare an ink composition.

| | |
|---|---|
| Carbon black dispersion liquid 3 after sulfonation treatment (preparation example 7) | 10.0 weight % |
| Trimethylol propane | 20.0 weight % |
| Glycerol | 20.0 weight % |
| 2-pyrrolidone | 4.0 weight % |
| Nissan anon BL-SF (amphoteric surfactant made by NOF Corporation) | 2.0 weight % |
| 2-ethyl-1,3-hexanediol | 2.0 weight % |
| FT-250 (made by NEOS) | 0.5 weight % |
| Emulsion | 3.0 weight % |
| PROXEL LV (preservative) | 0.2 weight % |
| Ion exchanged water | Balance |

EXAMPLE 14

With pH regulated to 9 by lithium hydroxide, the example 1 was repeated except that the following compositions were used, to thereby prepare an ink composition.

| | |
|---|---|
| Carbon black dispersion liquid 4 (cationic) after diazo compound treatment (preparation example 8) | 8.0 weight % |
| Trimethylol ethane | 22.5 weight % |
| Glycerol | 7.5 weight % |
| N-methyl-2-pyrrolidone | 2.0 weight % |
| Nissan anon BL-SF (amphoteric surfactant made by NOF Corporation) | 2.0 weight % |
| 2,2,4-trimethyl-1,3-pentanediol | 2.0 weight % |
| FT-250 (made by NEOS) | 0.5 weight % |
| Emulsion | 3.0 weight % |
| PROXEL LV (preservative) | 0.2 weight % |
| Ion exchanged water | Balance |

COMPARATIVE EXAMPLE 1

An ink composition having the following prescription was prepared, and a lithium hydroxide 10% solution was used for regulating pH to 9. Then, a membrane filter having an average pore diameter of 0.8 μm was used for filtering, to thereby obtain an ink composition.

| | |
|---|---|
| Polymer fine particle containing phthalocyanine pigment (preparation example 1) | 5.0 weight % |
| Diethylene glycol | 15.0 weight % |
| Glycerol | 5.0 weight % |
| 2-pyrrolidone | 2.0 weight % |
| ECTD-3NEX (anionic surfactant made by Nikko Chemicals) | 1.0 weight % |
| 2-ethyl-1,3-hexanediol | 2.0 weight % |
| Emulsion | 3.0 weight % |
| PROXEL LV (preservative) | 0.2 weight % |
| Ion exchanged water | Balance |

COMPARATIVE EXAMPLE 2

Excluding the use of the following compositions, the comparative example 1 was repeated. Lithium hydroxide was used for regulating pH to 9, to thereby prepare an ink composition.

| | |
|---|---|
| Polymer fine particle containing dimethyl quinacridone pigment (preparation example 2) | 6.0 weight % |
| Diethylene glycol | 15.0 weight % |
| Glycerol | 5.0 weight % |
| N-methyl-2-pyrrolidone | 2.0 weight % |
| ECTD-3NEX (anionic surfactant made by Nikko Chemicals) | 1.0 weight % |
| 2,2,4-trimethyl-1,3-pentanediol | 2.0 weight % |
| PROXEL LV (preservative) | 0.2 weight % |
| Ion exchanged water | Balance |

COMPARATIVE EXAMPLE 3

Excluding the use of the following compositions, the comparative example 1 was repeated. Lithium hydroxide was used for regulating pH to 9, to thereby prepare an ink composition.

| | |
|---|---|
| Polymer fine particle containing monoazo yellow pigment (preparation example 3) | 5.0 weight % |
| Triethylene glycol | 15.0 weight % |
| Glycerol | 5.0 weight % |
| N-hydroxyethyl-2-pyrrolidone | 2.0 weight % |
| Unisafe A-LY (amphoteric surfactant made by NOF Corporation) | 2.0 weight % |
| 2-ethyl-1,3-hexanediol | 2.0 weight % |
| Emulsion | 3.0 weight % |
| PROXEL LV (preservative) | 0.2 weight % |
| Ion exchanged water | Balance |

COMPARATIVE EXAMPLE 4

Excluding the use of the following compositions, the example 1 was repeated. Sodium hydroxide was used for regulating pH to 9, to thereby prepare an ink composition.

| | |
|---|---|
| Carbon black dispersion liquid 1 after diazo compound treatment (preparation example 5) | 4.0 weight % (pigment solid content) |
| Ethylene glycol | 15.0 weight % |
| Glycerol | 5.0 weight % |
| 2-pyrrolidone | 2.0 weight % |
| Nissan anon BL-SF (amphoteric surfactant made by NOF Corporation) | 2.0 weight % |
| 2,2,4-trimethyl-1,3-pentanediol | 2.0 weight % |
| PROXEL LV (preservative) | 0.2 weight % |
| Ion exchanged water | Balance |

Table 3 shows pigment density, wetting agent density, and ink viscosity of the ink compositions in the example 1 to the example 14 and the comparative example 1 to the comparative example 14.

TABLE 3

| | | Pigment solid content density (weight %) | Wetting agent density (weight %) | Viscosity cps (25° C.) | Surface tension (mN/m) |
|---|---|---|---|---|---|
| Ink set 1 | Example 1 Cyan | 8.0 | 30.0 | 7.52 | 24.3 |
| | Example 2 Magenta | 8.0 | 30.0 | 7.38 | 23.8 |
| | Example 3 Yellow | 8.0 | 30.0 | 7.11 | 24.7 |
| | Example 4 Black | 8.0 | 30.0 | 7.89 | 28.2 |
| Ink set 2 | Example 5 Cyan | 12.0 | 30.0 | 8.78 | 24.5 |
| | Example 6 Magenta | 12.0 | 30.0 | 9.24 | 24.8 |
| | Example 7 Yellow | 12.0 | 30.0 | 8.89 | 24.2 |
| | Example 8 Black | 8.0 | 30.0 | 8.14 | 26.8 |
| Ink set 3 | Example 9 Cyan | 15.0 | 30.0 | 9.34 | 25.3 |
| | Example 10 Magenta | 15.0 | 30.0 | 10.22 | 24.9 |
| | Example 11 Yellow | 15.0 | 30.0 | 9.58 | 25.4 |
| | Example 12 Black | 10.0 | 40.0 | 10.33 | 26.2 |
| Ink set 4 * | Example 13 Black | 10.0 | 40.0 | 7.46 | 26.7 |
| Ink set 5 * | Example 14 Black | 8.0 | 30.0 | 7.06 | 28.3 |
| Comparative ink set 1 | Comparative example 1 | 5.0 | 20.0 | 2.55 | 34.2 |
| | Comparative example 2 | 6.0 | 20.0 | 2.89 | 33.8 |
| | Comparative example 3 | 5.0 | 20.0 | 2.99 | 35.3 |
| | Comparative example 4 | 4.0 | 20.0 | 3.04 | 34.8 |

Then, the following tests were carried out on the example 1 to the example 14 and the comparative example 1 to the comparative example 4, using an ink set 1 to an ink set 5 which include cyan, magenta, yellow and black and a comparative ink set 1.

*For the ink set 4 and the ink set 5, the black ink of the ink set 2 was used.

How to evaluate:

(1) Sharpness of image (i) An ink-jet printer EM-900 (made by EPSON) was used for printing on each paper sheet by varying the driving voltage, frequency, pulse width of the head. Printing pattern: 100% duty for color pigment inks of yellow, magenta, and cyan; black ink filled with the black ink under the present invention was used by simultaneously printing characters. Printing conditions: Mj 35 pl, Vj 20 m/sec, frequency 1 kHz, and recording density (resolution) 360 dpi, and one pass printing. Hereinabove, the Mj denotes a size of a droplet of the ink ejected from the nozzle, and the Vj denotes a velocity of the droplet of the ink ejected from the nozzle.

(ii) In the conditions same as those in (i) above, one pass printing (solid printing, character printing) was carried out by varying driving voltage, frequency, pulse width of a head of an ink-jet printer IPSiO Jet300 made by Ricoh.

After drying the print, a total inspection was carried out on color bleeding (of two overlapped colors), image feathering, color tone, and image density by visual inspection and by using a reflection-type spectral colorimeter-densitometer (made by X-Rite) based on evaluation criteria. Described below are the printing paper sheets used for the tests.

(1) My paper (made by NBS Ricoh Co., Ltd.)

(2) Kamigen S (paper source S), reproduced paper (made by NBS Ricoh Co., Ltd.)

(3) PB paper (made by Canon)

(4) Multi Ace (Fuji Xerox Office Supply)

(5) Yamayuri paper (reproduced paper made by Oji Paper)

(6) LH paper (Fuji Xerox Office Supply)

(7) Xerox 4024 paper (Fuji Xerox Office Supply)

(8) Neenah Bond Paper (Kimberly-Clark)

Evaluation criteria

Excellent: Sharp printing with no bleeding or feathering found.

Good: Thin bleeding and/or feathering found in some paper sheets (reproduced paper).

Fair: Thin bleeding and/or feathering found in all paper sheets.

Not acceptable: Bleeding and/or feathering found, making character profile obscure.

(2) Dryness of Image

A filter was pressed to an image after printing in a certain condition until the ink is not transferred to the filter any more. Time required therefor was measured as drying time. For each paper sheet, 10 seconds or below was determined good.

(3) Preservability

The inks were inputted in a polyethylene vessel, to be preserved at −20° C., 5° C., 20° C., and 70° C. for 3 months under respective conditions. After the preservation, surface tension and viscosity were measured, and deposition was checked for. Those having no material change and the like are determined good.

(4) Reliability after Printing Rest

The head of IPSiO Jet 300 (printer made by Ricoh) was used for recovery after printing rest without capping, cleaning and the like in printing operation. In how many seconds the injection direction is deviated and the ejected droplet weight is varied were tested. Results of the reliability tests are shown in Table 4-1 and Table 4-2.

g was dropped therein, and then stirred for 8 hours at 100° C. to 105° C. Another hypochlorous acid soda (effective chlorine density 12%) 100 g was added to the liquid, followed by dispersion for 3 hours with a horizontal dispersing machine. The thus obtained slurry was diluted to 10 times with water, pH was regulated with lithium hydroxide, then an ultrafiltraion was carried out for desalinization-enrichment to electric conductivity of 0.2 mS/cm, to thereby obtain a carbon black dispersion liquid having pigment density of 15%. The thus obtained carbon black dispersion liquid was subjected to a centrifugal treatment for removing coarse grains, and then subjected to a nylon filter of 1 micron, to thereby obtain a carbon black dispersion liquid. Measured with micro track UPA, the carbon black dispersion liquid has an average particle diameter (D 50%) of 95 nm.

In the following, an ink composition was produced using the polymer fine particle dispersion liquids and carbon black dispersion liquids obtained through the preparation example 1 to the preparation example 8 and the 2 0 preparation example 9. The term "manufacturing example 1 to manufacturing example 14" are to be distinguished from "preparation example 1 to preparation example 14." Table 5 shows viscosity and surface tension of the ink compositions through the manufacturing example 1 to the manufacturing example 14.

TABLE 4-1

|  |  | Feathering | Color bleeding | Image density | Back though | RGB color tone | Dryness | Preservability | Reliability |
|---|---|---|---|---|---|---|---|---|---|
| Ink set 1 | Example 1 | Excellent | Excellent | 1.16 | 0.04 |  | 1 sec > | Good | 600 sec < |
|  | Example 2 | Excellent | Excellent | 1.14 | 0.04 | Good | 1 sec > | Good | 600 sec < |
|  | Example 3 | Excellent | Excellent | 1.13 | 0.03 |  | 1 sec > | Good | 600 sec < |
|  | Example 4 | Excellent | Excellent | 1.34 | 0.05 |  | 1 sec > | Excellent | 600 sec < |
| Ink set 2 | Example 5 | Excellent | Excellent | 1.26 | 0.03 |  | 1 sec > | Excellent | 600 sec < |
|  | Example 6 | Excellent | Excellent | 1.23 | 0.04 | Excellent | 1 sec > | Good | 600 sec < |
|  | Example 7 | Excellent | Excellent | 1.22 | 0.04 |  | 1 sec > | Excellent | 600 sec < |
|  | Example 8 | Excellent | Excellent | 1.43 | 0.03 |  | 1 sec > | Excellent | 600 sec < |
| Ink set 3 | Example 9 | Excellent | Excellent | 1.38 | 0.04 |  | 1 sec > | Good | 600 sec < |
|  | Example 10 | Excellent | Excellent | 1.29 | 0.04 | Excellent | 1 sec > | Excellent | 600 sec < |
|  | Example 11 | Excellent | Excellent | 1.26 | 0.03 |  | 1 sec > | Excellent | 600 sec < |
|  | Example 12 | Excellent | Excellent | 1.51 | 0.03 |  | 1 sec > | Good | 600 sec < |

TABLE 4-2

|  |  | Feathering | Color bleeding | Image density | Back though | RGB color tone | Dryness | Preservability | Reliability |
|---|---|---|---|---|---|---|---|---|---|
| Ink set 4 | Example 13 | Excellent | Excellent | 1.46 | 0.03 |  | 1 sec > | Excellent | 600 sec < |
| Ink set 5 | Example 14 | Excellent | Excellent | 1.43 | 0.04 |  | 1 sec > | Excellent | 600 sec < |
| Comparative ink set 1 | Comparative example 1 | Good | Fair | 1.02 | 0.14 |  | 1 sec > | Good | 600 sec < |
|  | Comparative example 2 | Good | Fair | 0.99 | 0.14 | Not acceptable | 1 sec > | Good | 600 sec < |
|  | Comparative example 3 | Good | Fair | 0.90 | 0.10 |  | 1 sec > | Good | 600 sec < |
|  | Comparative example 4 | Good | Fair | 1.11 | 0.19 |  | 1 sec > | Good | 600 sec < |

PREPARATION EXAMPLE 9

Prepare Carbon Black Dispersion Liquid

A commercially-available acid carbon black 300 g (Monarch 1300 made by Cabot Corporation) having pH 2.5 was sufficiently mixed with water 1000 milliliter, then a hypochlorous acid soda (effective chlorine density 12%) 450

MANUFACTURING EXAMPLE 1

An ink composition having the following prescription was prepared, and a lithium hydroxide 10% solution was used for regulating pH to 9. Then, a membrane filter having an average pore diameter of 0.8 μm was used for filtering, to thereby obtain an ink composition.

| Polymer fine particle dispersion containing copper phthalocyanine pigment (preparation example 1) | 20.0 weight % |
|---|---|
| 1,3-butanediol | 23.0 weight % |
| Glycerin | 8.6 weight % |
| 2-ethyl-1,3-hexanediol | 2.0 weight % |
| FT-110 (made by NEOS) | 0.5 weight % |
| PROXEL LV (made by Avecia) | 0.2 weight % |
| added by ion exchanged water, totalizing 100%. | |

MANUFACTURING EXAMPLE 2

The manufacturing example 1 was repeated except that the following compositions were used. Sodium hydroxide was used for regulating pH to 9, to thereby obtain an ink composition.

| Polymer fine particle dispersion containing dimethyl quinacridone pigment (preparation example 2) | 20.0 weight % |
|---|---|
| 1,3-butanediol | 24.5 weight % |
| Glycerin | 9.0 weight % |
| 2-ethyl-1,3-hexanediol | 2.0 weight % |
| FT-110 (made by NEOS) | 0.5 weight % |
| PROXEL LV (made by Avecia) | 0.2 weight % |
| added by ion exchanged water, totalizing 100%. | |

MANUFACTURING EXAMPLE 3

The manufacturing example 1 was repeated except that the following compositions were used. Lithium hydroxide was used for regulating pH to 9, to thereby obtain an ink composition.

| Polymer fine particle dispersion containing monoazo yellow pigment (preparation example 3) | 20.0 weight % |
|---|---|
| 1,3-butanediol | 24.5 weight % |
| Glycerin | 9.0 weight % |
| 2-ethyl-1,3-hexanediol | 2.0 weight % |
| FT-110 (made by NEOS) | 0.5 weight % |
| PROXEL LV (made by Avecia) | 0.2 weight % |
| added by ion exchanged water, totalizing 100%. | |

MANUFACTURING EXAMPLE 4

Black Pigment Ink

The manufacturing example 1 was repeated except that the following compositions were used. Sodium hydroxide was used for regulating pH to 9, to thereby obtain an ink composition.

| Carbon black dispersion (preparation example 9) | 20.0 weight % |
|---|---|
| 1,3-butanediol | 22.5 weight % |
| Glycerin | 7.5 weight % |
| 2-pyrrolidone | 2.0 weight % |
| Formula (IV) (R:C12, n = 9) | 2.0 weight % |
| 2-ethyl-1,3-hexanediol | 2.0 weight % |
| FT-110 (made by NEOS) | 0.15 weight % |
| PROXEL LV (made by Avecia) | 0.2 weight % |
| added by ion exchanged water, totalizing 100%. | |

MANUFACTURING EXAMPLE 5

The manufacturing example 1 was repeated except that the following compositions were used. Lithium hydroxide was used for regulating pH to 9, to thereby obtain an ink composition.

| Polymer fine particle dispersion containing copper phthalocyanine pigment (preparation example 1) | 20.0 weight % |
|---|---|
| 1,3-butanediol | 22.5 weight % |
| Glycerin | 7.5 weight % |
| 2-ethyl-1,3-hexanediol | 2.0 weight % |
| Formula (IV) (R:C12, n = 9) | 2.0 weight % |
| FT-110 (made by NEOS) | 0.5 weight % |
| PROXEL LV (made by Avecia) | 0.2 weight % |
| added by ion exchanged water, totalizing 100%. | |

MANUFACTURING EXAMPLE 6

The manufacturing example 1 was repeated except that the following compositions were used. Lithium hydroxide was used for regulating pH to 9, to thereby obtain an ink composition.

| Polymer fine particle dispersion containing dimethyl quinacridone pigment (preparation example 2) | 20.0 weight % |
|---|---|
| 1,3-butanediol | 22.5 weight % |
| Glycerin | 7.5 weight % |
| 2-ethyl-1,3-hexanediol | 2.0 weight % |
| Formula (IV) (R:C12, n = 9) | 2.0 weight % |
| FT-110 (made by NEOS) | 0.5 weight % |
| PROXEL LV (made by Avecia) | 0.2 weight % |
| added by ion exchanged water, totalizing 100%. | |

MANUFACTURING EXAMPLE 7

The manufacturing example 1 was repeated except that the following compositions were used. Lithium hydroxide was used for regulating pH to 9, to thereby obtain an ink composition.

| Polymer fine particle dispersion containing monoazo yellow pigment (preparation example 3) | 20.0 weight % |
|---|---|
| 1,3-butanediol | 24.0 weight % |
| Glycerin | 8.2 weight % |
| 2-ethyl-1,3-hexanediol | 2.0 weight % |
| Formula (IV) (R:C12, n = 9) | 2.0 weight % |
| FT-110 (made by NEOS) | 0.5 weight % |
| PROXEL LV (made by Avecia) | 0.2 weight % |
| added by ion exchanged water, totalizing 100%. | |

MANUFACTURING EXAMPLE 8

The manufacturing example 1 was repeated except that the following compositions were used. Lithium hydroxide was used for regulating pH to 9, to thereby obtain an ink composition.

| Polymer fine particle dispersion containing carbon black (preparation example 4) | 5.0 weight % |
|---|---|
| 1,6-hexanediol | 22.5 weight % |

-continued

| | |
|---|---|
| Glycerin | 7.5 weight % |
| 2-pyrrolidone | 2.0 weight % |
| Unisafe A-LY (amphoteric surfactant made by NOF Corporation) | 2.0 weight % |
| 2,2,4-trimethyl-1,3-pentanediol | 2.0 weight % |
| FT-110 (made by NEOS) | 0.15 weight % |
| PROXEL LV (made by Avecia) | 0.2 weight % |
| added by ion exchanged water, totalizing 100%. | |

MANUFACTURING EXAMPLE 9

The manufacturing example 1 was repeated except that the following compositions were used. Lithium hydroxide was used for regulating pH to 9, to thereby obtain an ink composition.

| | |
|---|---|
| Polymer fine particle dispersion containing phthalocyanine pigment (preparation example 1) | 20.0 weight % |
| 1,6-hexanediol | 22.5 weight % |
| Glycerin | 10.0 weight % |
| 2,2,4-trimethyl-1,3-pentanediol | 2.0 weight % |
| FT-110 (made by NEOS) | 0.5 weight % |
| PROXEL LV (made by Avecia) | 0.2 weight % |
| added by ion exchanged water, totalizing 100%. | |

MANUFACTURING EXAMPLE 10

The manufacturing example 1 was repeated except that the following compositions were used. Lithium hydroxide was used for regulating pH to 9, to thereby obtain an ink composition.

| | |
|---|---|
| Polymer fine particle dispersion containing dimethyl quinacridone pigment (preparation example 2) | 20.0 weight % |
| 1,6-hexanediol | 22.5 weight % |
| Glycerin | 10.0 weight % |
| 2,2,4-trimethyl-1,3-pentanediol | 2.0 weight % |
| FT-110 (made by NEOS) | 0.5 weight % |
| PROXEL LV (made by Avecia) | 0.2 weight % |
| added by ion exchanged water, totalizing 100%. | |

MANUFACTURING EXAMPLE 11

The manufacturing example 1 was repeated except that the following compositions were used. Lithium hydroxide was used for regulating pH to 9, to thereby obtain an ink composition.

| | |
|---|---|
| Polymer fine particle dispersion containing monoazo yellow pigment (preparation example 3) | 20.0 weight % |
| 1,6-hexanediol | 22.5 weight % |
| Glycerin | 10.0 weight % |
| 2,2,4-trimethyl-1,3-pentanediol | 2.0 weight % |
| FT-110 (made by NEOS) | 0.5 weight % |
| PROXEL LV (made by Avecia) | 0.2 weight % |
| added by ion exchanged water, totalizing 100%. | |

MANUFACTURING EXAMPLE 12

An ink composition having the following prescription was prepared, and a lithium hydroxide 10% solution was used for regulating pH to 9. Then, a membrane filter having an average pore diameter of 0.8 μm was used for filtering, to thereby obtain an ink composition.

| | |
|---|---|
| Polymer fine particle dispersion containing phthalocyanine pigment (preparation example 1) | 20.0 weight % |
| 1,3-butanediol | 24.5 weight % |
| Glycerin | 8.2 weight % |
| Formula (IV) (R:C12, n = 9) | 2.0 weight % |
| 2-ethyl-1,3-hexanediol | 2.0 weight % |
| PROXEL LV (made by Avecia) | 0.2 weight % |
| added by ion exchanged water, totalizing 100%. | |

MANUFACTURING EXAMPLE 13

The manufacturing example 1 was repeated except that the following compositions were used. Sodium hydroxide was used for regulating pH to 9, to thereby obtain an ink composition.

| | |
|---|---|
| Polymer fine particle dispersion containing dimethyl quinacridone pigment (preparation example 2) | 20.0 weight % |
| 1,3-butanediol | 22.5 weight % |
| Glycerin | 7.5 weight % |
| 2-ethyl-1,3-hexanediol | 2.0 weight % |
| Formula (IV) (R:C12, n = 9) | 2.0 weight % |
| PROXEL LV (made by Avecia) | 0.2 weight % |
| added by ion exchanged water, totalizing 100%. | |

MANUFACTURING EXAMPLE 14

The manufacturing example 1 was repeated except that the following compositions were used. Lithium hydroxide was used for regulating pH to 9, to thereby obtain an ink composition.

| | |
|---|---|
| Polymer fine particle dispersion containing monoazo yellow pigment (preparation example 3) | 20.0 weight % |
| 1,3-butanediol | 23.0 weight % |
| Glycerin | 7.8 weight % |
| 2-ethyl-1,3-hexanediol | 2.0 weight % |
| Formula (IV) (R:C12, n = 9) | 2.0 weight % |
| PROXEL LV (made by Avecia) | 0.2 weight % |
| added by ion exchanged water, totalizing 100%. | |

TABLE 5

Viscosity and surface tension of ink composition

| Manufacturing example | Viscosity (mPa · sec) | Surface tension (mN/m = dyne/cm) |
|---|---|---|
| 1 | 8.02 | 28.90 |
| 2 | 8.22 | 25.90 |
| 3 | 8.16 | 25.32 |
| 4 | 8.12 | 27.10 |
| 5 | 8.24 | 26.14 |
| 6 | 8.33 | 25.03 |
| 7 | 8.00 | 26.10 |
| 8 | 8.21 | 29.97 |

TABLE 5-continued

Viscosity and surface tension of ink composition

| Manufacturing example | Viscosity (mPa · sec) | Surface tension (mN/m = dyne/cm) |
|---|---|---|
| 9 | 8.12 | 29.86 |
| 10 | 8.31 | 26.45 |
| 11 | 8.14 | 26.09 |
| 12 | 8.08 | 30.20 |
| 13 | 8.11 | 30.02 |
| 14 | 8.07 | 30.01 |

Measuring device
Viscosity: R500 rotary viscosimeter (25° C.) made by TOKI SANGYO CO., LTD
Surface tension: CBVP-Z (25° C.) made by Kyowa Interface Science Co., Ltd.

EXAMPLE 15 TO EXAMPLE 17 AND COMPARATIVE EXAMPLE 5

The inks (cyan, magenta, yellow, and black) prepared by the manufacturing example 1 to the manufacturing example 14 were made into combinations in the following Table 6, to thereby carry out image evaluation tests.

Evaluation methods are shown below.

[Sharpness of Image]

(Printer)
(1) An ink-jet printer EM-900 (made by EPSON) was used for printing on each paper sheet by varying the driving voltage, frequency, pulse width of the head. Printing pattern: 100% duty for color inks of yellow, magenta, and cyan; black ink filled with the black ink under the present invention was used by simultaneously printing characters. Printing conditions: Mj 35 pl, Vj 20 m/sec, frequency 1 kHz, and recording density (resolution) 360 dpi, and one pass printing. Hereinabove, the Mj denotes a size of a droplet of the ink ejected from the nozzle, and the Vj denotes a velocity of the droplet of the ink ejected from the nozzle.
(2) An ink-jet printer BJC430 made by Canon which is of bubble-jet type (registered trademark), and an ink-jet printer hp diskjet815 made by Hewlett-Packard which is of bubble-jet type (registered trademark) were used. BK cartridges thereof were loaded with ink. Tests were carried out based on the following conditions: Mj 35 pl, Vj 20 m/sec, frequency 1 kHz, resolution 360 dpi, one pass printing (solid printing and character printing).
(3) In the conditions same as those in (1) and (2) above, one pass printing (solid printing, character printing) was carried out by varying driving voltage, frequency, pulse width of a head of an ink-jet printer IPSiO Jet300 made by Ricoh.

(Paper Used for Printing)
Described below are the printing paper sheets used for the tests.
(1) My paper (made by NBS Ricoh Co., Ltd.)
(2) Kamigen S (paper source S), reproduced paper (made by NBS Ricoh Co., Ltd.)
(3) PB paper (made by Canon)
(4) Multi Ace (Fuji Xerox Office Supply)
(5) Yamayuri paper (reproduced paper made by Oji Paper)
(6) LH paper (Fuji Xerox Office Supply)
(7) Xerox 4024 paper (Fuji Xerox Office Supply)
(8) Neenah Bond Paper (Kimberly-Clark)

(Evaluation Criteria)
After drying the print, a total inspection was carried out on color bleeding (of two overlapped colors) and image feathering based on the following evaluation criteria.
Excellent: Sharp printing with no bleeding or feathering found.
Good: Thin bleeding and/or feathering found in some paper sheets (reproduced paper).
Fair: Thin bleeding and/or feathering found in all paper sheets.
Not acceptable: Bleeding and/or feathering found, making character profile obscure.

TABLE 6

Ink set of examples

| | Ink set | | | |
|---|---|---|---|---|
| | Cyan | Yellow | Magenta | Black |
| Example 15 | Manufacturing example 1 | Manufacturing example 3 | Manufacturing example 2 | Manufacturing example 4 |
| Example 16 | Manufacturing example 5 | Manufacturing example 7 | Manufacturing example 6 | Manufacturing example 8 |
| Example 17 | Manufacturing example 9 | Manufacturing example 11 | Manufacturing example 10 | Manufacturing example 4 |
| Comparative example 5 | Manufacturing example 12 | Manufacturing example 14 | Manufacturing example 13 | Manufacturing example 4 |

Paper sheets for the test using any of the printers in (1) to (3), showed the results in the following table 7.

TABLE 7

Sharpness of image

| | Feathering | Color bleeding |
|---|---|---|
| Example 15 | Excellent | Excellent |
| Example 16 | Excellent | Excellent |
| Example 17 | Excellent | Excellent |
| Comparative example 5 | Good | Good |

[Color Image Evaluation—Color Reproducibility (Hue, Chroma)]

An ink-jet printer IPSiO Jet300 (made by Ricoh) was used for printing on My paper (made by NBS Ricoh Co., Ltd.). Printing pattern: 100% duty for color inks of yellow, magenta, and cyan; black ink filled with the black ink under the present invention was used by simultaneously printing characters. Printing conditions: Mj 35 pl, Vj 20 m/sec, frequency 1 kHz, recording density (resolution) 360 dpi, and one pass printing.

After drying the print, a total inspection was carried out on solid printing image sections of A) monochrome of each of yellow, magenta and cyan and of B) a blue portion, a green portion and a red portion by mixtures thereof, using a reflection-type spectral colorimeter-densitometer (made by X-Rite). Then, a coordinate of L*a*b* calorimetric system of chrominance method specified by CIE (Commission International de l'Éclair age) was obtained, to obtain chroma C* of each color. The higher the chroma C*, the more preferable the ink coloring is.

The chroma C* can be defined by the following formula.

$$C^* = [(a^*)^2 + (b^*)^2]^{1/2}$$

TABLE 8

| | Chroma | | | |
|---|---|---|---|---|
| | Example 15 | Example 16 | Example 17 | Comparative example 5 |
| Yellow | 83.32 | 82.46 | 82.22 | 78.32 |
| Green | 45.65 | 44.98 | 44.82 | 40.16 |
| Cyan | 51.18 | 51.04 | 50.81 | 48.03 |
| Blue | 35.17 | 34.89 | 34.27 | 33.54 |
| Magenta | 60.01 | 59.77 | 59.49 | 55.22 |
| Red | 57.14 | 56.86 | 56.42 | 53.90 |

As described in the detailed and specific explanations above, the conventional penetration ink is excellent in quick drying and fixation, while it has problems in connection with image quality such as character feathering, decreased print density, color bleeding and the like. The high-viscosity ink composition having ink viscosity of 5.0 cps or more, more preferably 8.0 cps or more under the present invention is capable of producing a high-quality image equivalent to that of a laser printer, under the following printing conditions: Mj 5 pl to 35 pl, Vj 6 m/sec to 20 m/sec, frequency 1 kHz or more, resolution 300 dpi or more, and one pass printing. More specifically, the above ink composition under the present invention comprises a polymer fine particle containing a coloring material, which particle is 8 weight % or more (solid content), and contains at least one wetting agent selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane. Moreover, with the ink composition under the present invention, the coloring material can remain on a paper sheet thereby causing far less strike-throughs than the conventional technology, thus enabling both-side printing (strike-through density: present invention having 0.02 to 0.04, compared with the conventional technology having 0.15 to 0.2). Moreover, under the present invention, a mutual action caused by a combination of i) the polyol having 8 to 11 carbon atoms, ii) the surfactants (expressed by formula (I) to formula (IX)) and iii) the fluorine surfactant allows the ink to have surface tension of 40 dyne/cm or less. With this, even the polymer fine particle under the present invention having 8 weight % or more (solid content) and high density of 8.0 cps or more can promptly be fixed to almost all record materials, to thereby feature a sufficient marking property, have a good wettability to the head member, improve drainage of ink composition bubble, improve frequency response, and remarkably improve ejection stability. Although having high pigment density and high viscosity, the ink composition under the present invention can cause less nozzle cloggings and thereby can more stabilize printing than the conventional technology having high pigment density and high viscosity. The above feature of the present invention is attributable to an effect of one or more of the wetting agent that is selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane. Although having high pigment density and high viscosity, the ink composition under the present invention can remarkably improve preservability compared with the conventional technology having high pigment density and high viscosity. The above feature of the present invention is attributable to an effect of one or more of the wetting agent that is selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane. With the ink set under the present invention, combining the color ink (having the above structure) with the black ink (having a structure in which the color material is replaced with the self-dispersion type carbon black) can cause a minute amount of color bleedings between black and color, thus bringing about a high-quality image that is equivalent to that of the laser printer. Moreover, under the present invention, such an effect is brought about as to provide a recording liquid cartridge incorporating a recording liquid, and a printer equipped with the cartridge, the recording liquid being capable of having high permeability, high reliability and high safety, and bringing about an excellent image.

The ink set using the pigment for the coloring material of the color ink under the present invention can bring about a more remarkable effect especially in magenta ink than other color inks, when the ink set uses the fluorine surfactant having a specific structure. In this case, the ink set under the present invention can remarkably improve chroma, improve coloring property, improve chroma of secondary colors on the print image on the plain paper such as green, blue and red, especially green, improve the ink's uniform dying property on the plain paper sheet on solid printing image sections, to thereby improve chroma of all colors. Especially, the coloring property can be improved which was a problem of the pigment ink.

What is claimed is:

1. An ink-jet recording ink, comprising:
    a polymer emulsion which comprises a polymer fine particle containing a coloring material, the coloring material being insoluble in water or being unlikely to dissolve in the water;
    at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane;
    one of selected from the group consisting of:
        a polyol, as a second hydroxy compound, having 8 to 11 carbon atoms, and
        a glycol ether having 8 to 11 carbon atoms;
    a water-soluble organic solvent;
    water;
    at least one of an anionic surfactant, a nonionic surfactant, and an amphoteric surfactant; and
    at least one fluorine surfactant,
    wherein the fluorine surfactant is the perfluroalkyl sulfonate expressed by the following formula A:

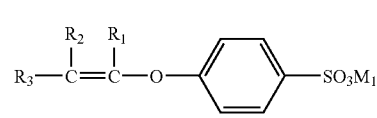

Formula A wherein $R_1$, $R_2$, and denote one of a perfluoro alkyl group and a fluorine atom, and M1 denotes any one of Li, Na, and K, and wherein the coloring material is a pigment and
wherein the ink-jet recording ink has a viscosity of 5 mPa.sec or more at 25° C.

2. The ink-jet recording ink according to claim 1, wherein the viscosity of the ink-jet recording ink is 8 mPa.sec to 20 mPa.sec at 25° C.

3. The ink-jet recording ink according to claim 1, wherein the ink-jet recording ink has a surface tension 40 dyne/cm or less.

4. The ink-jet recording ink according to claim 1, wherein a content of the polymer emulsion comprising the coloring material is 8 weight % to 20 weight % as solid content.

5. The ink-jet recording ink according to claim 1, wherein a content of the wetting agent is 10 weight % to 50 weight %.

6. The inkjet recording ink according to claim 1, wherein a weight ratio of the wetting agent to the polymer emulsion as the solid content is 2 to 5.

7. The ink-jet recording ink according to claim 1, wherein the ink-jet recording ink comprising the polymer emulsion comprising the coloring material has an average particle diameter 0.16 μm or less.

8. The ink-jet recording ink according to claim 1, wherein a content of the fluorine surfactant is 0.05 weight % to 5 weight %.

9. The ink-jet recording ink according to claim 1, wherein one of a vinyl polymer and a polyester polymer constitutes the polymer emulsion.

10. The ink-jet recording ink according to claim 1, wherein one of the polyol, as the second hydroxy compound, having the 8 to 11 carbon atoms, and the glycol ether having the 8 to 11 carbon atoms comprises 2-ethyl-1,3-hexane diol.

11. The ink-jet recording ink according to claim 1, wherein one of the polyol, as the second hydroxy compound, having the 8 to 11 carbon atoms, and the glycol ether having the 8 to 11 carbon atoms comprises 2,2,4-trimethyl-1,3-pentane diol.

12. The ink-jet recording ink according to claim 1, wherein at least one of the anionic surfactant, the nonionic surfactant, and the amphoteric surfactant is selected from the group consisting of surfactants expressed respectively by the following formulas (I), (II), (III), (IV), (V), (VI), (VII), (VIII), and (IX):

$$R_1-O-(CH_2CH_2O)_mCH_2COOM \quad (I)$$

wherein $R_1$ denotes a branchable alkyl group having 6 to 14 carbon atoms, m denotes an integer of 3 to 12, M denotes an alkali metal ion, a quaternary ammonium, a quaternary phosphonium, and an alkanolamine,

(II)

wherein $R_2$ denotes a branched alkyl group having 5 to 16 carbon atoms, M denotes an alkali metal ion, a quaternary ammonium, a quaternary phosphonium, and an alkanolamine,

(III)

wherein R denotes a branchable carbon chain having 6 to 14 carbon atoms, and k denotes an integer of 5 to 20, $$R-(OCH_2CH_2)nOH \quad (IV)$$

wherein R is a branchable carbon chain having 6 to 14 carbon atoms, and n denotes an integer of 5 to 20,

(V)

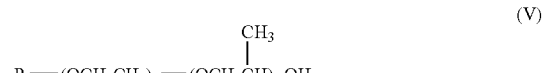
(V)

wherein R denotes a branchable carbon chain having 6 to 14 carbon atoms,

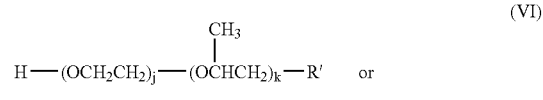
(VI)

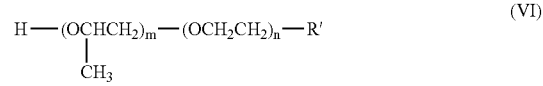
(VI)

wherein R' denotes a carbon chain having 6 to 14 carbon atoms, and,

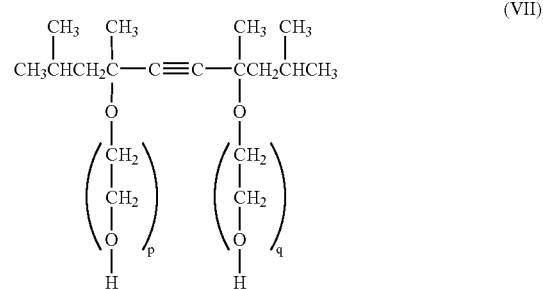
(VII)

wherein p and q are integers of 0 to 40,

(VIII)

wherein each of $R_1$ and $R_2$ denotes an alkyl group having 1 to 3 carbon atoms or a hydroxyalkyl group having 1 to 3 carbon atoms, $R_3$ denotes an alkyl group having 10 to 20 carbon atoms or an alkenyl group having 10 to 20 carbon atoms,

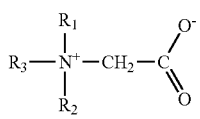
(IX)

wherein each of $R_1$ and $R_2$ denotes an alkyl group having 1 to 3 carbon atoms or a hydroxyalkyl group having 1 to 3 carbon atoms, $R_3$ denotes an alkyl group having 10 to 16 carbon atoms, wherein $R_3$ is allowed to contain an amide group, otherwise, $R_3$ is an alkyl group derived from a coconut oil, and wherein each of j, k, m, n denote integers of 1 to 20.

13. The ink-jet recording ink according to claim 1, further comprising a compound expressed by the following formula:

HO—(CH$_2$)n-OH wherein n denotes an integer of 5, 7 and 8.

14. The ink-jet recording ink according to claim 1, further comprising at least one of:
a polyol as a third hydroxy compound other than the first hydroxy compounds and the second hydroxy compound,
a lactam,
a carbamide,
an alkyl glycine,
a betaine compound, and
a saccharide.

15. The ink-jet recording ink according to claim 14, wherein the third hydroxy compound comprises one selected from the group consisting of ethylene glycol, tetraethylene glycol, hexylene glycol, polyethylene glycol, tripropylene glycol, 2,3-butane diol, 1,3-propane diol, 1,4-butane diol, 2-methyl-2,4-pentane diol, 1,2,4-butane triol, 1,2,6-hexane triol, thiodiglycol, and pentaerythritol.

16. The ink-jet recording ink according to claim 14, wherein the lactam comprises one selected from the group consisting of 2-pyrrolidone, N-methyl-2-pyrrolidone, N-hydroxyethyl-2-pyrrolidone, and P-caprolactam.

17. The ink-jet recording ink according to claim 14, wherein the carbamide comprises one selected from the group consisting of urea, thiocarbamide, ethylene carbamide, 1,3-dimethyl-2-imidazolidinone.

18. The ink-jet recording ink according to claim 14, wherein the saccharide comprises one selected from the group consisting of maltitol, sorbitol, gluconolactone, and maltose.

19. An ink-jet recording ink set, comprising:
a black ink; and
at least one color ink,
wherein the black ink comprises;
a self-dispersing type pigment,
at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane,
one of selected from the consisting of:
a polyol, as a second hydroxy compound, having 8 to 11 carbon atoms, and
a glycol ether having 8 to 11 carbon atoms,
at least one of an anionic surfactant, a nonionic surfactant, and an amphoteric surfactant,
a water-soluble organic solvent, and
water,
wherein the black ink has a viscosity of 5 mPa.sec or more at 25° C.,
wherein the color ink comprises;
a water dispersion which is a polymer emulsion which comprises a polymer fine particle containing a coloring material, the coloring material being insoluble in water or being unlikely to dissolve in the water,
at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane,
one selected from the group consisting of:
a polyol, as a second hydroxy compound, having 8 to 11 carbon atoms,
and
a glycol ether having 8 to 11 carbon atoms,
a water-soluble organic solvent,
water,
at least one of an anionic surfactant, a nonionic surfactant, and an amphoteric surfactant, and
at least one fluorine surfactant,
wherein the color ink has a viscosity of 5 mPa.sec or more at 25° C.

20. The ink-jet recording ink set according to claim 19, wherein the viscosity of the ink is 8 mPa.sec to 20 mPa.sec at 25° C.

21. The ink-jet recording ink set according to claim 19, wherein the ink-jet recording ink set has a surface tension 40 dyne/cm or less.

22. The ink-jet recording ink set according to claim 19, wherein a content of at least one of the pigment or the polymer emulsion is 8 weight % to 20 weight % as solid content.

23. The ink-jet recording ink set according to claim 19, wherein a content of the wetting agent is 10 weight % to 50 weight %.

24. The inkjet recording ink set according to claim 19, wherein an average particle diameter of a particle contained is 0.16 μm or less.

25. The ink-jet recording ink set according to claim 19, wherein the self-dispersion type pigment comprises on a surface thereof at least one hydrophilic group selected from the group consisting of a carboxyl group, a sulfone group, a carbonyl group, and a hydroxyl group.

26. The ink-jet recording ink set according to claim 19, wherein the self-dispersion type pigment comprises on a surface thereof, via at least another atomic group, at least one hydrophilic group selected from the group consisting of a carboxyl group, a sulfone group, a carbonyl group, and a hydroxyl group.

27. The ink-jet recording ink set according to claim 19, wherein one of the polyol, as the second hydroxy compound, having the 8 to 11 carbon atoms, and the glycol ether having the 8 to 11 carbon atoms comprises 2-ethyl-1,3-hexane diol.

28. The ink-jet recording ink set according to claim 19, wherein one of the polyol, as the second hydroxy compound, having the 8 to 11 carbon atoms, and the glycol ether having the 8 to 11 carbon atoms comprises 2,2,4-trimethyl-1,3-pentane diol.

29. The ink-jet recording ink set according to claim 19, wherein the fluorine surfactant is at least one selected from the group consisting of perfluoroalkyl sulfonate, perfluoroalkyl carboxylate, perfluoroalkyl phosphoric acid ester, perfluoroalkyl ethylene oxide adduct, perfluoroalkyl betaine, and perfluoroalkyl amineoxide compound, and a content of the fluorine surfactant is 0.05 weight % to 5 weight %.

30. The inkjet recording ink set according to claim 29, wherein the fluorine surfactant in the ink is the perfluoroalkyl sulfonate expressed by the following formula A:

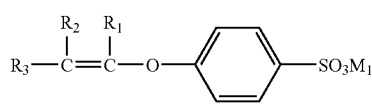

Formula A wherein $R_1$, $R_2$, and $R_3$ denote one of a perfluoro alkyl group and a fluorine atom, and M1 denotes any one of Li, Na, and K and wherein the coloring material is a pigment.

31. The ink-jet recording ink set according to claim 29, wherein at least one of the anionic surfactant, the nonionic surfactant, and the amphoteric surfactant is selected from the group consisting of surfactants expressed respectively by the following formulas (I), (II), (III), (IV), (V), (VI), (VII), (VIII), and (IX):

$$R_1\text{—}O\text{—}(CH_2CH_2O)mCH_2COOM \quad (I)$$

wherein $R_1$ denotes a branchable alkyl group having 6 to 14 carbon atoms, m denotes an integer of 3 to 12, M denotes an alkali metal ion, a quaternary ammonium, a quaternary phosphonium, and an alkanolamine,

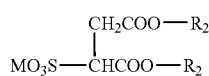

(II)

wherein $R_2$ denotes a branched alkyl group having 5 to 16 carbon atoms, M denotes an alkali metal ion, a quaternary ammonium, a quaternary phosphonium, and an alkanolamine,

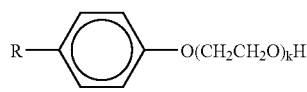

(III)

wherein R denotes a branchable carbon chain having 6 to 14 carbon atoms, and k denotes an integer of 5 to 20, $$R\text{—}(OCH_2CH_2)nOH \quad (IV)$$

wherein R is a branchable carbon chain having 6 to 14 carbon atoms, and n denotes an integer of 5 to 20,

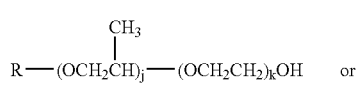

(V)

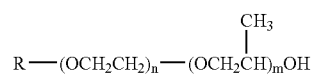

(V)

wherein R denotes a branchable carbon chain having 6 to 14 carbon atoms,

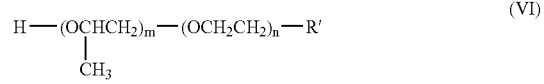

wherein R' denotes a carbon chain having 6 to 14 carbon atoms, and

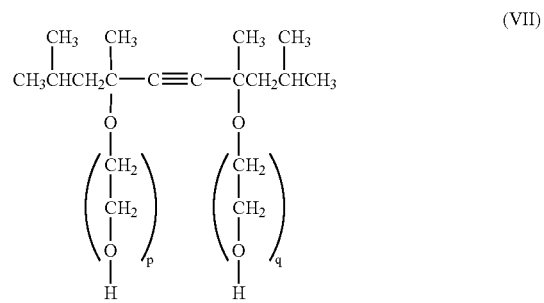

(VII)

wherein p and q are integers of 0 to 40,

(VIII)

wherein each of $R_1$ and $R_2$ denotes an alkyl group having 1 to 3 carbon atoms or a hydroxyalkyl group having 1 to 3 carbon atoms, $R_3$ denotes an alkyl group having 10 to 20 carbon atoms or an alkenyl group having 10 to 20 carbon atoms,

(IX)

wherein each of $R_1$ and $R_2$ denotes an alkyl group having 1 to 3 carbon atoms or a hydroxyalkyl group having 1 to 3 carbon atoms, $R_3$ denotes an alkyl group having 10 to 16 carbon atoms, wherein $R_3$ is allowed to contain an amide group, otherwise, $R_3$ is an alkyl group derived from a coconut oil, and wherein each of j, k, m, n denote integers of 1 to 20.

32. The ink-jet recording ink set according to claim 19, further comprising a compound expressed by the following formula:

wherein n denotes an integer of 5, 7 and 8.

33. The ink-jet recording ink set according to claim 19, further comprising at least one selected from the group consisting of:
  a polyol as a third hydroxy compound other than the first hydroxy compounds and the second hydroxy compound,
  a lactam,
  a carbamide,
  an alkyl glycine,
  a betaine compound, and
  a saccharide.

34. An ink-jet printing method for ejecting an ink by applying an energy to an ink-jet recording ink,
  wherein the ink-jet recording ink comprises:
    a polymer emulsion which comprises a polymer fine particle containing a coloring material, the coloring material being insoluble in water or being unlikely to dissolve in the water;
    at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane;
    one selected from the group consisting of:
      a polyol, as a second hydroxy compound, having 8 to 11 carbon atoms, and
      a glycol ether having 8 to 11 carbon atoms;
    a water-soluble organic solvent;
    water;
    at least one of an anionic surfactant, a nonionic surfactant, and an amphoteric surfactant; and
    at least one fluorine surfactant,
  wherein the fluorine surfactant is the perfluroalkyl sulfonate expressed by the following formula A:

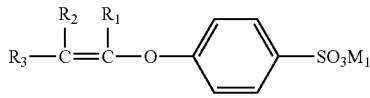

wherein $R_1$, $R_2$, and $R_3$ denote one of a perfluoro alkyl group and a fluorine atom, and M1 denotes any one of Li, Na, and K, and wherein the coloring material is a pigment
  wherein the ink-jet recording ink has a viscosity of 5 mPa.sec or more at 25° C.

35. The ink-jet printing method according to claim 34, wherein the ink is ejected by applying thereto a heat energy.

36. The ink-jet printing method according to claim 34, wherein the ink is ejected by applying thereto a dynamic energy.

37. The ink-jet printing method according to claim 34, wherein the ink-jet recording ink is used under the following conditions:
  an Mj of 5 pl to 35 pl, a Vj of 6 m to 20 m, a frequency of 1 kHz or more, a resolution of 300 dpi or more, and one pass printing, the Mj denoting a size of a droplet of the ink ejected from a nozzle, and the Vj denoting a velocity of the droplet of the ink ejected from the nozzle.

38. An ink-jet printing method for ejecting an ink by applying an energy to an ink-jet recording ink set,
  wherein the ink-jet recording ink set comprises:
    a black ink; and
    at least one color ink,
  wherein the black ink comprises;
    a self-dispersing type pigment,
    at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane,
    one selected from the group consisting of:
      a polyol, as a second hydroxy compound, having 8 to 11 carbon atoms,
      and
      a glycol ether having 8 to 11 carbon atoms,
    at least one of an anionic surfactant, a nonionic surfactant, and an amphoteric surfactant,
    a water-soluble organic solvent, and
    water,
  wherein the black ink has a viscosity of 5 mPa.sec or more at 25° C.,
  wherein the color ink comprises;
    a water dispersion which is a polymer emulsion which comprises a polymer fine particle containing a coloring material, the coloring material being insoluble in water or being unlikely to dissolve in the water,
    at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane,
    one selected from the group consisting of:
      a polyol, as a second hydroxy compound, having 8 to 11 carbon atoms,
      and
      a glycol ether having 8 to 11 carbon atoms,
    a water-soluble organic solvent,
    water,
    at least one of an anionic surfactant, a nonionic surfactant, and an amphoteric surfactant, and
    at least one fluorine surfactant,
  wherein the color ink has a viscosity of 5 mPa.sec or more at 25° C.

39. The ink-jet printing method according to claim 38, wherein the ink is ejected by applying thereto a heat energy.

40. The ink-jet printing method according to claim 38, wherein the ink is ejected by applying thereto a dynamic energy.

41. The ink-jet printing method according to claim 38, wherein the ink-jet recording ink set is used under the following conditions:
  an Mj of 5 pl to 35 pl, a Vj of 6 m to 20 m, a frequency of 1 kHz or more, a resolution of 300 dpi or more, and one pass printing, the Mj denoting a size of a droplet of the ink ejected from a nozzle, and the Vj denoting a velocity of the droplet of the ink ejected from the nozzle.

42. An ink cartridge, comprising an ink receiver receiving therein an ink-jet recording ink, wherein the ink-set recording ink comprises:
a polymer emulsion which comprises a polymer fine particle containing a coloring material, the coloring material being insoluble in water or being unlikely to dissolve in the water;
at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane;
one selected from group consisting of:
a polyol, as a second hydroxy compound, having 8 to 11 carbon atoms, and
a glycol ether having 8 to 11 carbon atoms;
a water-soluble organic solvent;
water;
at least one of an anionic surfactant, a nonionic surfactant, and an amphoteric surfactant; and
at least one fluorine surfactant,
wherein the fluorine surfactant is the perfluoroalkyl sulfonate expressed by the following formula A:

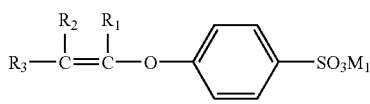

Formula A wherein $R_1$, $R_2$, and $R_3$ denote one of a perfluoro alkyl group and a fluorine atom, and M1 denotes any one Li, Na, and K, and wherein the coloring material is a pigment and
wherein the ink-jet recording ink has a viscosity of 5 mPa.sec or more at 25° C.

43. An ink cartridge, comprising an ink receiver receiving therein an ink-jet recording ink set,
wherein the ink-jet recording ink set comprises:
a black ink; and
at least one color ink,
wherein the black ink comprises;
a self-dispersing type pigment,
at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane,
one selected from the group consisting of:
a polyol, as a second hydroxy compound, having 8 to 11 carbon atoms,
and
a glycol ether having 8 to 11 carbon atoms,
at least one of an anionic surfactant, a nonionic surfactant, and an amphoteric surfactant,
a water-soluble organic solvent, and
water,
wherein the black ink has a viscosity of 5 mPa.sec or more at 25° C.,
wherein the color ink comprises;
a water dispersion which is a polymer emulsion which comprises a polymer fine particle containing a coloring material, the coloring material being insoluble in water or being unlikely to dissolve in the water;
at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane,
one selected from the group consisting of:
a polyol, as a second hydroxy compound, having 8 to 11 carbon atoms,
and
a glycol ether having 8 to 11 carbon atoms,
a water-soluble organic solvent,
water,
at least one of an anionic surfactant, a nonionic surfactant, and an amphoteric surfactant, and
at least one fluorine surfactant,
wherein the color ink has a viscosity of 5 mPa.sec or more at 25° C.

44. An ink-jet printer, comprising:
one of an ink receiver and an ink cartridge receiving therein:
an ink-jet recording ink; and
one of an ink-jet recording head and a record unit which drops and ejects the ink by an action of an energy,
wherein the ink-jet recording ink comprises:
a polymer emulsion which comprises a polymer fine particle containing a coloring material, the coloring material being insoluble in water or being unlikely to dissolve in the water;
at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane;
one selected from the group consisting of:
a polyol, as a second hydroxy compound, having 8 to 11 carbon atoms, and
a glycol ether having 8 to 11 carbon atoms;
a water-soluble organic solvent;
water;
at least one of an anionic surfactant, a nonionic surfactant, and an amphoteric surfactant; and
at least one fluorine surfactant,
wherein the fluorine surfactant is the perfluoroalkyl sulfonate expressed by the following formula A:

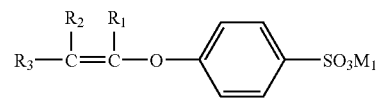

Formula A wherein $R_1$, $R_2$, $R_3$ denote one of a perfluoro alkyl group and a fluorine atom, and M1 denotes any one of Li, Na, and K, and
wherein the ink-jet recording ink has a viscosity of 5 mPa.sec or more at 25° C.

45. The ink-jet printer according to claim 44, wherein the ink-jet recording head has a nozzle plate which has a surface formed with an ink-repellent coating layer subjected to a eutectic plating.

46. The ink-jet printer according to claim 44, wherein the ink-jet recording head has a nozzle diameter of 30 μm or less.

47. An ink-jet printer, comprising:
one of an ink receiver and an ink cartridge receiving therein:

an ink-jet recording ink set; and
one of an ink-jet recording head and a record unit which drops and ejects the ink by an action of an energy,
wherein the ink-jet recording ink set comprises:
a black ink; and
at least one color ink,
wherein the black ink comprises;
a self-dispersing type pigment,
at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane,
one selected from the group consisting of:
a polyol, as a second hydroxy compound, having 8 to 11 carbon atoms, and
a glycol ether having 8 to 11 carbon atoms,
at least one of an anionic surfactant, a nonionic surfactant, and an amphoteric surfactant,
a water-soluble organic solvent, and
water;
wherein the black ink has a viscosity of 5 mPa.sec or more at 25° C.,
wherein the color ink comprises;
a water dispersion which is a polymer emulsion which comprises a polymer fine particle containing a coloring material, the coloring material being insoluble in water or being unlikely to dissolve in the water,
at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane,
one selected from the group consisting of:
a polyol, as a second hydroxy compound, having 8 to 11 carbon atoms, and
a glycol ether having 8 to 11 carbon atoms,
a water-soluble organic solvent,
water,
at least one of an anionic surfactant, a nonionic surfactant, and an amphoteric surfactant, and
at least one fluorine surfactant,
wherein the color ink has a viscosity of 5 mPa.sec or more at 25° C.

48. The ink-jet printer according to claim 47, wherein the ink-jet recording head has a nozzle plate which has a surface formed with an ink-repellent coating layer subjected to a eutectic plating.

49. The ink-jet printer according to claim 47, wherein the ink-jet recording head has a nozzle diameter of 30 μm or less.

50. A recorded article on which a recording is carried out by a printing method for ejecting an ink by applying an energy to an ink-jet recording ink,
the ink-jet recording ink comprising:
a polymer emulsion which comprises a polymer fine particle containing a coloring material, the coloring material being insoluble in water or being unlikely to dissolve in the water;
at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane;

one selected from the group consisting of:
a polyol, as a second hydroxy compound, having 8 to 11 carbon atoms, and
a glycol ether having 8 to 11 carbon atoms;
a water-soluble organic solvent;
water;
at least one of an anionic surfactant, a nonionic surfactant, and an amphoteric surfactant; and
at least one fluorine surfactant,
wherein the fluorine surfactant is the perfluoroalkyl sulfonate expressed by the following formula:

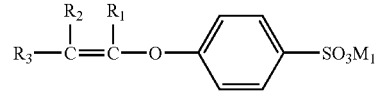

Formula A $R_1$, $R_2$, and $R_3$ denote one of a perfluoro alkyl group and a fluorine atom, and M1 denotes any one Li, Na, and K, and wherein the coloring material is a pigment
wherein the ink-jet recording ink has a viscosity of 5 mPa.sec or more at 25° C.

51. A recorded article on which a recording is carried out by a printing method for ejecting an ink by applying an energy to an ink-jet recording ink set,
the ink-jet recording ink set comprising:
a black ink; and
at least one color ink,
wherein the black ink comprises;
a self-dispersing type pigment,
at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane,
one selected from the group consisting of:
a polyol, as a second hydroxy compound, having 8 to 11 carbon atoms,
and
a glycol ether having 8 to 11 carbon atoms,
at least one of an anionic surfactant, a nonionic surfactant, and an amphoteric surfactant;
a water-soluble organic solvent, and
water,
wherein the black ink has a viscosity of 5 mPa.sec or more at 25° C.,
wherein the color ink comprises;
a water dispersion which is a polymer emulsion which comprises a polymer fine particle containing a coloring material, the coloring material being insoluble in water or being unlikely to dissolve in the water;
at least one wetting agent, as a first hydroxy compound, selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane,
one selected from the group consisting of:
a polyol, as a second hydroxy compound, having 8 to 11 carbon atoms,
and
a glycol ether having 8 to 11 carbon atoms,
a water-soluble organic solvent,
water,
at least one of an anionic surfactant, a nonionic surfactant, and an amphoteric surfactant, and
at least one fluorine surfactant, wherein the fluorine surfactant is the perfluoroalkyl sulfonate expressed by the following formula A:
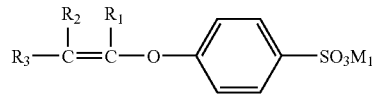
Formula A
wherein $R_1$, $R_2$, and $R_3$ denote one of a perfluoro alkyl group and a fluorine atom, and M1 denotes any one of Li, Na, and K, and wherein the coloring material is a pigment and
wherein the color ink has a viscosity of 5 mPa.sec or more at 25° C.
* * * * *